(12) United States Patent
Chu et al.

(10) Patent No.: US 8,666,361 B2
(45) Date of Patent: Mar. 4, 2014

(54) SYSTEM AND METHOD OF PROVIDING INFORMATION ACCESS ON A PORTABLE DEVICE

(75) Inventors: Kang Chih Chu, Waterloo (CA); Gregory Jason Fields, Waterloo (CA)

(73) Assignee: BlackBerry Limited, Waterloo, Ontario (CA)

(*) Notice: Subject to any disclaimer, the term of this patent is extended or adjusted under 35 U.S.C. 154(b) by 0 days.

(21) Appl. No.: 13/551,386

(22) Filed: Jul. 17, 2012

(65) Prior Publication Data

US 2014/0024330 A1    Jan. 23, 2014

(51) Int. Cl.
*H04M 11/04*       (2006.01)

(52) U.S. Cl.
USPC ............... 455/404.1; 455/411; 455/521

(58) Field of Classification Search
USPC ..................... 455/521, 404.1, 411
See application file for complete search history.

(56) References Cited

U.S. PATENT DOCUMENTS

| | | | |
|---|---|---|---|
| 5,742,666 A | 4/1998 | Alpert | |
| 5,933,080 A | 8/1999 | Nojima | |
| 6,205,327 B1 * | 3/2001 | Sentinelli | 455/407 |
| 6,574,484 B1 | 6/2003 | Carley | |
| 7,466,235 B1 | 12/2008 | Kolb | |
| 2002/0131330 A1 | 9/2002 | Zion et al. | |
| 2003/0076932 A1 | 4/2003 | Andrew | |
| 2003/0104790 A1 | 6/2003 | Ylitalo | |
| 2004/0024706 A1 | 2/2004 | Leduc | |
| 2004/0103000 A1 | 5/2004 | Owurowa et al. | |
| 2004/0203576 A1 | 10/2004 | Droste et al. | |
| 2004/0203622 A1 | 10/2004 | Esque et al. | |
| 2005/0151642 A1 | 7/2005 | Tupler et al. | |
| 2006/0026689 A1 | 2/2006 | Barker et al. | |
| 2006/0079269 A1 | 4/2006 | Sorotzkin | |

(Continued)

FOREIGN PATENT DOCUMENTS

| | | |
|---|---|---|
| CA | 2691345 | 7/2010 |
| DE | 100 64 978 C1 | 7/2002 |

(Continued)

OTHER PUBLICATIONS

"3rd Generation Partnership Project; Technical Specification Group Services and System Aspects; Man-Machine Interface (MMI) of the User Equipment (UE) (Release 7)," 3GPP TS 22.030 v7.0.1 (Jul. 2005).

(Continued)

*Primary Examiner* — Kwasi Karikari
(74) *Attorney, Agent, or Firm* — Finnegan, Henderson, Farabow, Garrett & Dunner LLP

(57) ABSTRACT

A portable device and method of providing information stored in a memory is provided. A portable device may be capable of storing In Case of Emergency (ICE) information comprising a number of ICE entries and which may be placed in a locked condition, the portable device comprising: a man-machine interface; a display; and, a processor coupled to the display and to the man-machine interface, wherein the processor is adapted to cause the display, in response to detection of one or more predetermined gestures on the man-machine interface, to display at least one ICE entry; and wherein the display displays the at least one ICE entry even if the portable device is in the locked condition, and if the at least one ICE entry is displayed while the portable device is in the locked condition, other information stored on the portable device remains protected.

45 Claims, 24 Drawing Sheets

(56) References Cited

U.S. PATENT DOCUMENTS

| | | | |
|---|---|---|---|
| 2006/0142057 A1 | 6/2006 | Schuler et al. | |
| 2006/0172720 A1 | 8/2006 | Islam et al. | |
| 2007/0102527 A1 | 5/2007 | Eubank et al. | |
| 2007/0117574 A1 | 5/2007 | Watanabe | |
| 2007/0135043 A1 | 6/2007 | Hayes | |
| 2007/0243853 A1 | 10/2007 | Bumiller et al. | |
| 2008/0005301 A1 | 1/2008 | Li | |
| 2008/0070546 A1 | 3/2008 | Lee | |
| 2008/0080687 A1 | 4/2008 | Broms | |
| 2008/0166992 A1 | 7/2008 | Ricordi | |
| 2008/0284587 A1 | 11/2008 | Saigh | |
| 2009/0005068 A1 | 1/2009 | Forstall et al. | |
| 2009/0047923 A1 | 2/2009 | Jain et al. | |
| 2009/0164467 A1 | 6/2009 | Ala-Lahti | |
| 2009/0205041 A1 | 8/2009 | Michalske | |
| 2010/0069099 A1* | 3/2010 | Dunn et al. | 455/466 |
| 2010/0190467 A1 | 7/2010 | Scott et al. | |
| 2011/0041102 A1* | 2/2011 | Kim | 715/863 |
| 2011/0088003 A1* | 4/2011 | Swink et al. | 715/863 |
| 2011/0159844 A1 | 6/2011 | Gillet et al. | |

FOREIGN PATENT DOCUMENTS

| | | |
|---|---|---|
| DE | 10064978 | 7/2002 |
| DE | 103 23 582 A1 | 12/2004 |
| DE | 10323582 | 12/2004 |
| EP | 1170969 A1 | 1/2002 |
| EP | 2214385 | 8/2010 |
| GB | 2 401 285 | 11/2004 |
| GB | 2401285 | 11/2004 |
| JP | 2004-120467 | 4/2004 |
| WO | 01/41458 | 6/2001 |
| WO | 2004/054278 A2 | 6/2004 |
| WO | 2004051976 | 6/2004 |
| WO | 2004054278 | 6/2004 |
| WO | 2004/082190 A2 | 9/2004 |
| WO | 2004/104898 | 12/2004 |
| WO | 2005053337 | 6/2005 |
| WO | 2005/069676 | 7/2005 |
| WO | 2006135120 | 12/2006 |
| WO | 2007118331 | 10/2007 |

OTHER PUBLICATIONS

"I.C.E. (in Case of Emergency) Initiative [Edited]," Cingular Customer Forums, Aug. 4, 2008, Retrieved from http://forums.cingular.com/cng/board/message?board.id=announcements&message.id=206.

"ICE Your Cell Phone for Safety," CBS News, London, Jul. 26, 2005, CBS Broadcasting, Inc., Retrieved from www.cbsnews.com/stories/2005/07/26/earlyshow/printable711715.shtml.

"ICE," Retrieved from http://www.ci.miramar.fl.us/fire/ice.htm on Mar. 31, 2006.

Advisory Action for U.S. Appl. No. 12/361,116 dated Nov. 14, 2011 (3 pages).

Chaves, Susan, "ICE First application turns cell phones into lifesavers," The Darien Time, Darien, Connecticut, Mar. 16, 2006, Retrieved from http://www.acorn-online.com/news/publish/article_5358.shtml.

Chinese Office Action (with translation) for Chinese Application No. 200780022704.7 dated Feb. 29, 2012 (15 pages).

Coates, Sam, "ICE Cell Phone Plan Would Help Rescuers; Idea to Designate Next of Kin in Electronic Address Book is Gaining Popularity; [Final Edition]," The Washington Post, Jul. 18, 2005, p. A.06, Washington, D.C.

English-language translation of Korean Office Action that issued on Mar. 25, 2010 from corresponding Korean Patent Application No. 10-2008-7027918.

European Search Report for EP Application No. 09151567.6 dated May 14, 2009.

European Search Report for EP Application No. 09151568.4 dated Jun. 7, 2010 (5 pages).

European Search Report for EP Application No. 09151569.2 dated May 13, 2009.

Extended European Search Report dated Jul. 6, 2009, issued in reference to European Patent Application No. 09151568.4.

Extended European Search Report dated May 20, 2009, issued in reference to European Patent Application No. 09151567.6.

Extended European Search Report dated May 20, 2009, issued in reference to European Patent Application No. 09151569.2.

Extended European Search Report for EP 09151568.4 dated Jul. 6, 2009 (9 pages).

Hallburn, Mark, "Putnam county Debuts ICE Program," Putnamlive.com, Retrieved from the Internet URL:http://web.archive.org/web/20051210102349/http://putnamlive.com/PutnamCountyDebutsICEProgram.html.

Hibbert, David, "Help Out in a Crisis—With ICE," Lockergnome LLC, Jul. 14, 2005, Retrieved from www.channels.lockergnome.com/mobile/archives/20050714_help_out_in_a_crisis_with_ice.phtml.

MacInnes, Alexander, "Safety campaign urges storing contact numbers on cellphones," Herald News, Aug. 3, 2005, North Jersey Media Group (2005), Retrieved from www.northjersey.com.

Meyers, Michelle, "ICE your cell phone," CNET News.com, Jul. 19, 2005, Retrieved from http://news.com.com/2061-10800 3-5795310.html.

Morrison, Michael, "Blackberry in a SnapR," Jul. 1, 2005, SAMS, XP007904690 ISBN: 0-672-32670-1.

Office Action for U.S. Appl. No. 12/361,052 dated Dec. 1, 2011 (12 pages).

Office Action for U.S. Appl. No. 12/361,052 dated Jun. 30, 2011 (8 pages).

Office Action for related U.S. Appl. No. 12/361,084 dated Jul. 19, 2011 (6 pages).

Office Action for related U.S. Appl. No. 12/361,084 dated Oct. 3, 2011 (9 pages).

Office Action for related U.S. Appl. No. 12/361,116 dated May 17, 2011 (12 pages).

Office Action for Related U.S. Appl. No. 12/361,116 dated Sep. 27, 2011 (14 pages).

Office Action for U.S. Appl. No. 12/361,084 dated Jan. 12, 2012 (9 pages).

Office Action for U.S. Appl. No. 12/361,084 dated Jul. 19, 2011 (10 pages).

Office Action for U.S. Appl. No. 12/361,084 dated Oct. 3, 2011 (9 pages).

Office Action for U.S. Appl. No. 12/361,116 dated May 17, 2011 (14 pages).

Office Action for U.S. Appl. No. 12/361,116 dated Sep. 27, 2011 (14 pages).

Zatz, Arline, "Star of Life," Rescue-EMS Magazine, Jul./Aug. 1992, Retrieved from www.angelfire.com/co/fantasyfigures/staroflife.html.

PCT Search Report dated Mar. 14, 2013 based on PCT/CA2012/050487 (10 pages).

European Office Action for European Application No. 09163500.3 dated Dec. 12, 2012 (6 pages).

U.S. Advisory Action for related U.S. Appl. No. 12/361,052, dated Sep. 10, 2012 (3 pages).

U.S. Advisory Action for related U.S. Appl. No. 12/361,084, dated Feb. 23, 2012 (3 pages).

U.S. Advisory Action for related U.S. Appl. No. 12/361,084, dated Nov. 14, 2012 (2 pages).

U.S. Office Action for related U.S. Appl. No. 12/361,052, dated Apr. 25, 2012 (8 pages).

U.S. Office Action for related U.S. Appl. No. 12/361,052, dated Jul. 3, 2012 (9 pages).

U.S. Office Action for related U.S. Appl. No. 12/361,084, dated Aug. 27, 2012 (10 pages).

U.S. Office Action for related U.S. Appl. No. 12/361,084, dated May 15, 2012 (9 pages).

U.S. Office Action for related U.S. Appl. No. 12/361,116, dated Dec. 20, 2012 (15 pages).

U.S. Office Action for related U.S. Appl. No. 13/616,297, dated Nov. 15, 2012 (11 pages).

* cited by examiner

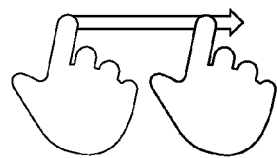
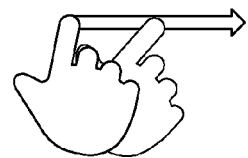
FIG. 17A          FIG. 17B
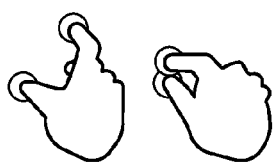
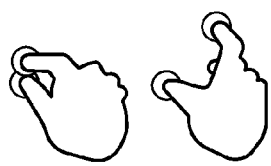
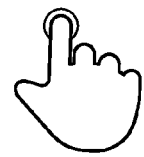
FIG. 17C          FIG. 17D          FIG. 17E
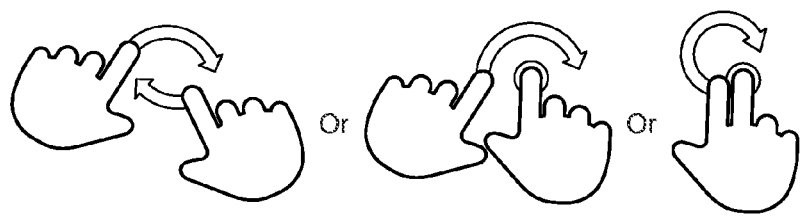
FIG. 17F

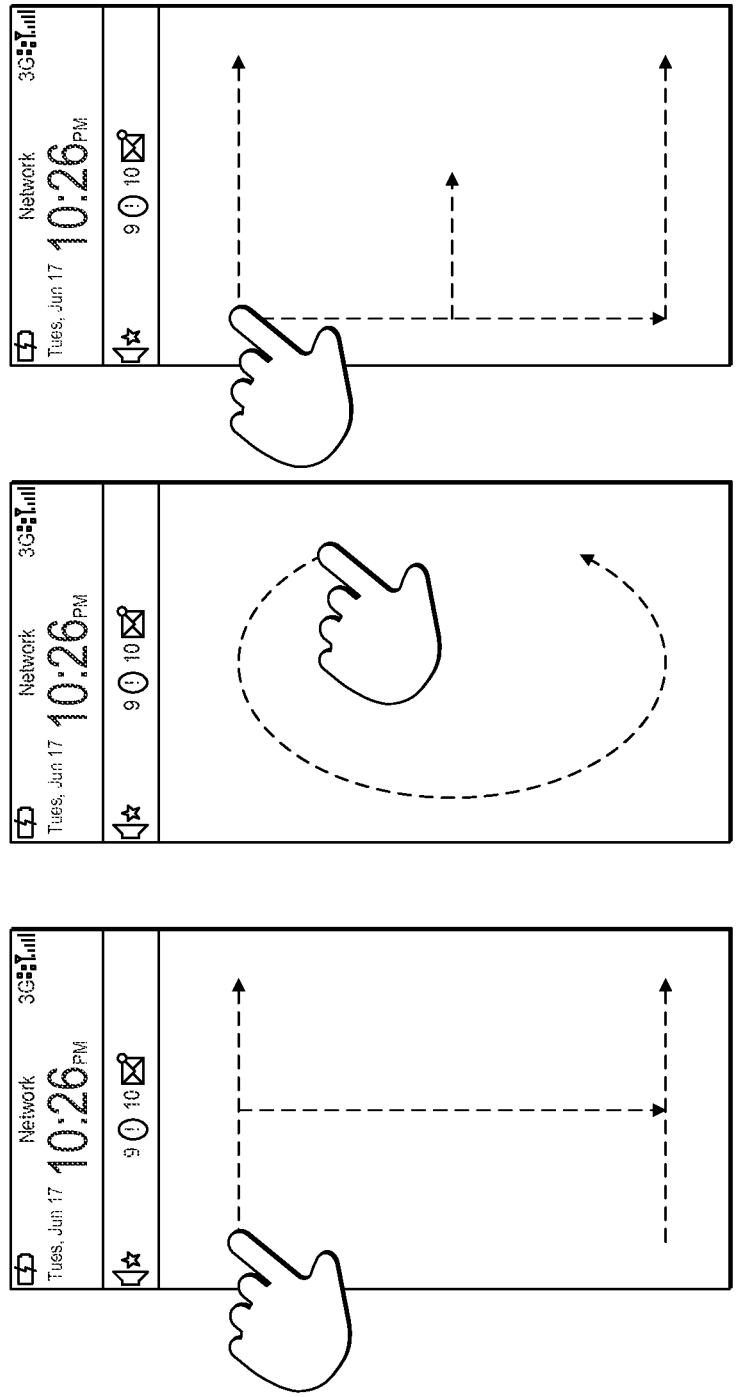

SYSTEM AND METHOD OF PROVIDING INFORMATION ACCESS ON A PORTABLE DEVICE

This patent document relates generally to portable devices, and in particular to a system and method of providing information access on such devices.

BACKGROUND

The world presents many hazardous situations to its human inhabitants. Some of these are natural disasters, for example tsunamis, hurricanes, tornadoes, floods and landslides. Others are of man-made origin, for example transportation accidents, acts of war and terrorism. One common denominator in all of these events is a need to help victims in as timely and effective fashion possible under the circumstances. When impersonal events happen and individuals are injured, the event becomes very personal with access to personal medical information and emergency contacts becomes of paramount importance. In Case of Emergency (ICE) information is crucial to the treatment of disaster and accident victims. Obtaining this information is particularly difficult when the disasters are also responsible for damaging local infrastructure, such as communications systems. Ironically systems most needed during widespread disasters may also be compromised by those same disasters.

Consequently, there is a need to provide ICE information for individuals that is not dependent upon real-time access to communications infrastructure.

BRIEF DESCRIPTION OF THE DRAWINGS

An embodiment of the patent disclosure will now be described by way of example only with reference to the following drawings in which:

FIG. 17A to K illustrate schematically example gestures;

FIG. 19A to G illustrate example gestures for providing access to emergency information according to one embodiment;

DETAILED DESCRIPTION

Figure 1:
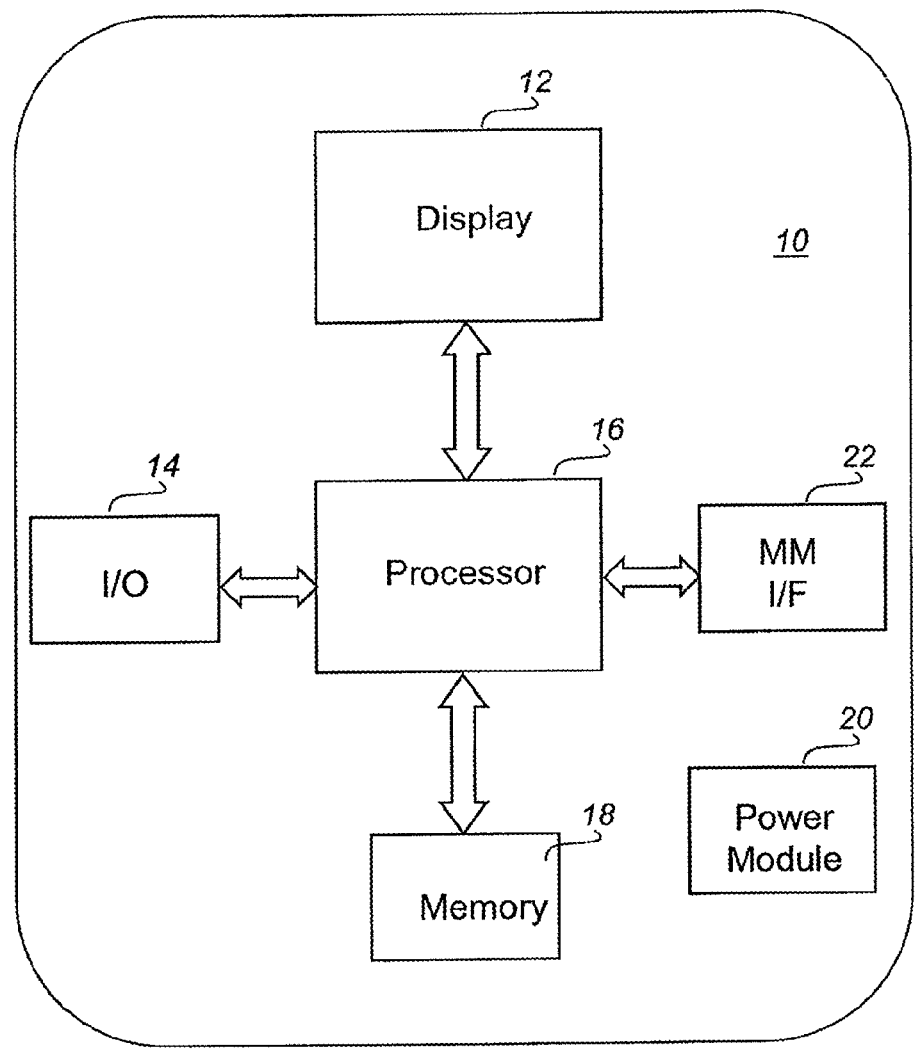
FIG. 1 illustrates an example of a generic portable electronic device.

The patent disclosure describes a solution to one or more of the problems described above. Accordingly, the present disclosure teaches a system and method of providing information access on portable devices.

One thing a great many individuals have in common is carrying portable electronic devices. For example, there are personal music players, such as Motion Picture Experts Group, Audio Layer 3 (MP3) players, personal data assistants (PDAs), and various wireless devices such as cell phones and electronic mail (email) devices. On any given day, an individual may carry several of these devices.

Increasingly manufacturers of portable electronic devices are combining functions of several different devices into a single device. Most recent examples of this are cell phones that include digital camera or MP3 player functions. This trend is expected to continue, with further integration anticipated with each new generation of devices. This trend enhances the likelihood that individuals carry such a device. This integration of features is possible because the current generation of devices have a large number of common components. Such common components include a display screen, an input/output port, a central processor (CPU), a memory, a power module and a tactile man-machine interface.

In accordance with an embodiment of the patent disclosure, there is provided an information access system for providing information. The information access system comprises an information repository for storing information and an access module for providing access to the information.

In accordance with an embodiment of the patent disclosure, there is provided a portable device comprising a display for displaying in case of emergency information, a man-machine interface for receiving requests for the in case of emergency information, a processor coupled to the display and to the man-machine interface and including the access module for accessing in case of emergency information in dependence upon a predetermined operation, and a memory including in case of emergency information.

In accordance with another embodiment of the patent disclosure, there is provided a method of providing information access on a portable device comprising the steps of storing information in a memory and providing access to the information in dependence upon at least one predetermined keystroke.

In accordance with another embodiment of the patent disclosure, there is provided a portable device capable of storing In Case of Emergency (ICE) information comprising a number of ICE entries and which may be placed in a locked condition, the portable device comprising: a man-machine interface; a display; and, a processor coupled to the display and to the man-machine interface, wherein the processor is adapted to cause the display, in response to detection of one or more predetermined gestures on the man-machine interface, to display at least one ICE entry; and wherein the display displays the at least one ICE entry even if the portable device is in the locked condition, and if the at least one ICE entry is displayed while the portable device is in the locked condition, other information stored on the portable device remains protected.

In accordance with another embodiment of the patent disclosure, there is provided a method of providing access to emergency information in a portable device having a display and a man-machine interface, the portable device being capable of storing In Case of Emergency (ICE) information comprising a number of ICE entries and which may be placed in a locked condition, the method comprising: in response to detection of one or more predetermined gestures on the man-machine interface, displaying at least one ICE entry; wherein even if the portable device is in the locked condition, the at least one ICE entry is displayed, and if the at least one ICE entry is displayed while the portable device is in the locked condition, other information stored on the portable device remains protected.

In accordance with another embodiment of the patent disclosure, there is provided a portable device capable of storing information and which may be placed in a locked condition, the portable device comprising: a man-machine interface; a subscriber information module 'SIM' for storing In Case of Emergency (ICE) information; and a processor configured to limit access by a user only to the stored ICE information in response to detection of a predetermined gesture performed by the user on the man-machine interface even if the portable device is in the locked condition.

In accordance with another embodiment of the patent disclosure, there is provided a portable device comprising: a man-machine interface; and wherein the portable device is adapted to have inserted a universal integrated circuit card (UICC) configured to store at least emergency information and the portable device is configured to limit access by a user only to the emergency information stored in the UICC, in response to detection of a predetermined gesture performed by the user on the man-machine interface, even if at least one of the portable device and the UICC is in a locked condition.

In accordance with another embodiment of the patent disclosure, there is provided a portable device capable of storing information and which may be placed in a locked condition, the portable device comprising: a man-machine interface; a subscriber information module 'SIM' for storing at least emergency information comprising a plurality of ICE entries; a display; and, a processor coupled to the display and to the man-machine interface, and comprising an access module for providing a user with access to the emergency information in the SIM in response to detection of one or more predetermined gestures performed by the user even if the portable device is in the locked condition, wherein the processor is adapted to cause, in response to the detection even if the portable device is in the locked condition, the display to display the plurality of ICE entries upon the user's access to the emergency information; wherein during the user's access to the emergency information while the portable device is in the locked condition, other information stored on the portable device remains protected.

In accordance with another embodiment of the patent disclosure, there is provided a method of providing access to emergency information in a portable device having a subscriber information module 'SIM', the portable device being capable of storing information and which may be placed in a locked condition, the method comprising: storing at least emergency information comprising a plurality of ICE entries in the SIM; and, providing a user with access to the emergency information in the SIM in response to detection of one or more predetermined key gestures performed by the user even if the portable device is in the locked condition; in response to the detection even if the portable device is in the locked condition displaying the plurality of ICE entries upon the user's access to the emergency information; wherein during the user's access to the emergency information while the portable device is in the locked condition, other information stored on the portable device remains protected.

A system and method of the patent disclosure is now described with reference to various examples of how the embodiments can best be made and used. For convenience, like reference numerals are used throughout the description and several views of the drawings to indicate like or corresponding parts, wherein the various elements are not necessarily drawn to scale.

Referring to FIG. 1 there is illustrated in a component diagram an example of a generic portable electronic device 10, in which an embodiment of the present patent disclosure may be implemented. The generic portable device 10 includes a display screen 12, an input/output port 14, a processor 16, a memory 18, a power module 20 and a tactile man-machine interface 22. These components are common to portable electronic devices individuals carry with them on a daily basis. Advantageously, the ubiquitous nature of such devices is used by the present system and method to store ICE information on such devices. Examples of portable devices suitable for storing ICE information are cell phones, wireless data/email devices, PDAs and MP3 players.

Figure 2:
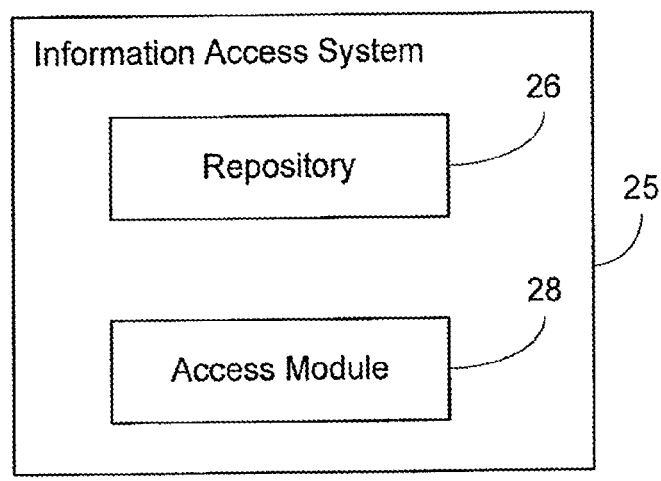
FIG. 2 illustrates in a block diagram an example of an information access system for storing and providing information, in accordance with an embodiment of the present patent disclosure.

Referring to FIG. 2 there is illustrated in a block diagram an example of an information access system 25 for storing and providing information, in accordance with an embodiment of the present patent disclosure. The information access system 25 comprises an information repository 26 for storing information, and an access module 28 for providing access to the information. Other components may be added to the information access system 25. The components of the information access system 25 may be implemented in components of a portable device 10. Information stored in a device may be locked. Such locking of information may include user access to specific information being secured and/or the entire device being secured to all users. Advantageously, a predetermined key stroke may be used to unlock the information. i.e., a locked device may be unlocked to provided the information, or access to information that is secured in an unlocked device may be provided. Examples of locking conditions are further described below.

Preferably, the information access system 25 is used to store and provide access to in case of emergency (ICE) information. The remainder of this disclosure will discuss the invention with respect to ICE information. However, other information may be used in place of ICE information.

The repository 26 can be implemented in memory 18 for ICE information storage on the device 10. Examples of memory in various portable devices include subscriber information module (SIM) cards for wireless terminals with a removable SIM, and mobile equipment (ME) for wireless terminals without a removable SIM or equivalent. The term subscriber information module in this disclosure encompasses SIM, Universal SIM (USIM), Internet Protocol Multimedia Services Identity Module (ISIM), Removable User Identity Module (RUIM) and other removable subscriber information modules. ICE information may also be stored in the ME even when the device uses a SIM card. Such storage in the ME enables the user to change the SIM (for example, when roaming) without loss of ICE information and without the need to immediately download the information to the SIM card. Such storage in the ME also enables the user to have ICE information available if the operator providing the new SIM has not implemented ICE.

Figure 3:
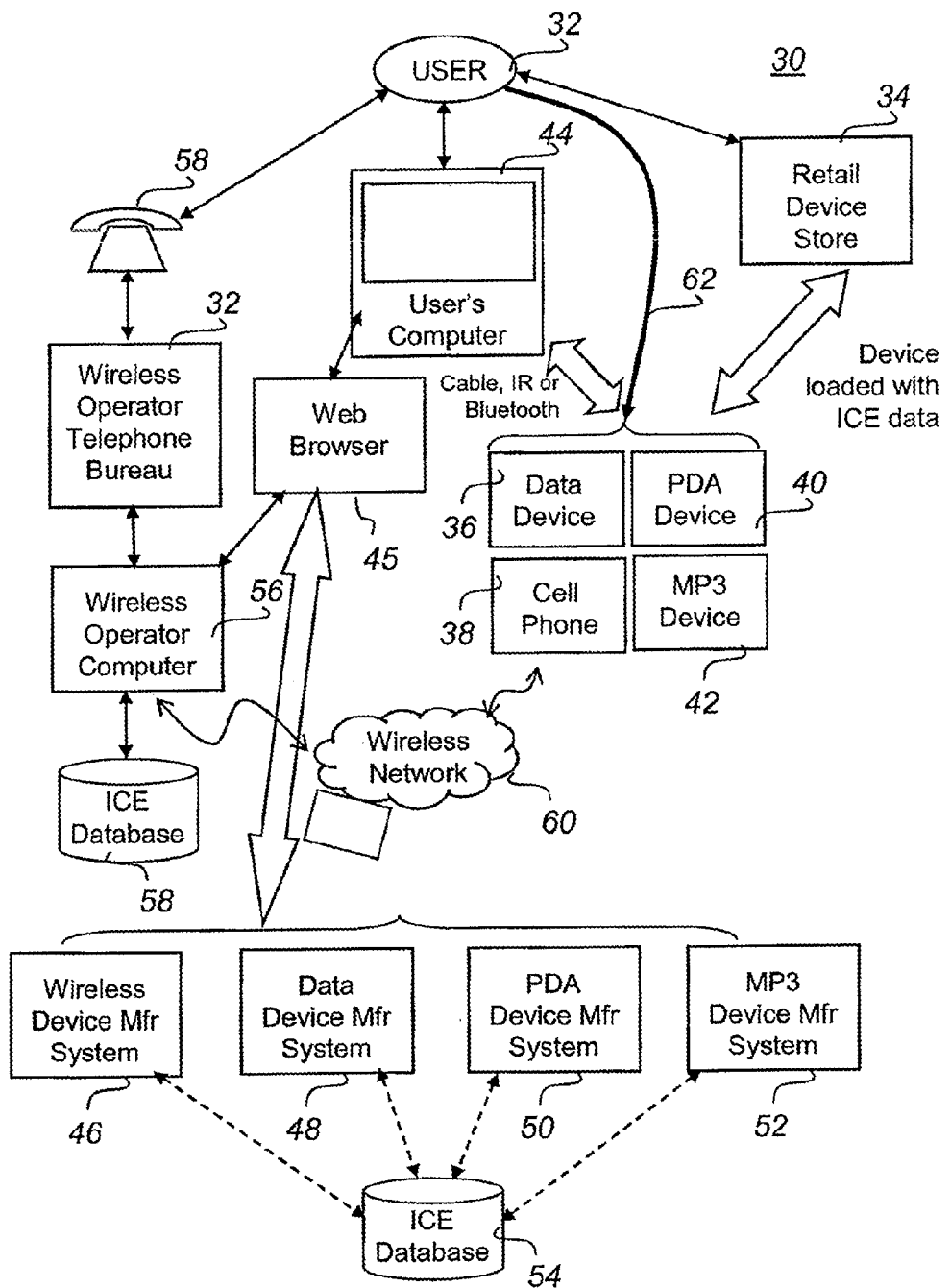
FIG. 3 illustrates in an information flow diagram an example of loading ICE information, in accordance with an embodiment of the information access system.

Referring to FIG. 3 there is illustrated in an information flow diagram an example of loading ICE information (30), in accordance with an embodiment of the ICE system. In the method 30 of FIG. 3 various portable devices are considered for loading ICE information. A user 32 may use any one of a number of different approaches depending upon the type of device and the resources available to the user. In a direct approach, the user 32 takes the device to a retail device store 34 where any device (for example, a data device 36, a cell phone 38, a PDA device 40 or an MP3 device 42) can be directly loaded with ICE information by cable, infrared or Bluetooth™ connection to a computer in the retail device store 34. Similarly the user 32 can add, delete, change or update ICE information on their portable electronics devices 36, 38, 40 or 42.

If the user 32 has a personal computer 44, a connect to the devices via cable, infrared or Bluetooth can be used to load, add, delete, change or update ICE information on their portable electronics devices 36, 38, 40 or 42. A program downloaded from the manufacturer or from the wireless operator to the user's personal computer (PC) enables the user to enter the data and view it, likely in its entirety, on the PC screen. Changes can be made to the data and the ICE information can then be directly downloaded over a cable or Bluetooth from the PC to the device.

In addition to a direct link, a computer 44 can use a web browser 45 to access device manufacturer systems 46, 48, 50 or 52 to load, add, delete, change or update ICE information and have that information stored centrally on a database(s) 54 and on their portable electronics devices 36, 38, 40 or 42. For portable devices with or without a QWERTY keyboard, the use of a computer terminal linked to the operator or manufacturer's computer system provides a very user-friendly way of easily entering the information, and of having the data stored for restoration of ICE information when required. The operator or manufacturer may provide means of adapting the information to other devices with different display characteristics or of assisting the user in adapting the information to other formats.

For portable devices having wireless communication capability, the web browser 45 can be used to access a wireless operator computer to load add, delete, change or update ICE information for the portable electronics devices 36, 38 or 40. Such changes can be stored in a database 58, and then transferred via a wireless network 60 to the portable electronics devices 36, 38 or 40.

Finally, portable devices 36, 38, 40 or 42 having user input interfaces such as keypads, keyboards, touch pads and stylus devices can have ICE information directly input 62.

Examples of different terminal keyboard (man-machine interface 22 of FIG. 1) entries include TAP or iTAP method on a cell phone or similar keypad, SureType™ on some BlackBerry™ models, and typing on a QWERTY keyboard.

Synchronizing the ICE information with a central database could then be accomplished using the input/output port that allows them to be linked to a personal computer or wireless interfaces such as Bluetooth that provide a local communications link to the portable device and software resident on the computer 44. Alternatively, for wireless devices, synchronization can be completed via the wireless network 60.

In some cases, for example devices used by children, the individual responsible for the loading of the ICE information could be a parent or guardian rather than the actual device user (child). This could be linked to credit card billing information, for example with music downloading on MP3 players.

An example of an implementation is a program in the user's PC 44 with a local connection for independent input of the ICE data, together with access to the operator's or manufacturer's database (54 or 58). This archiving of the data allows it to be restored quickly when a replacement or additional device is used or is desired.

Figure 4A:
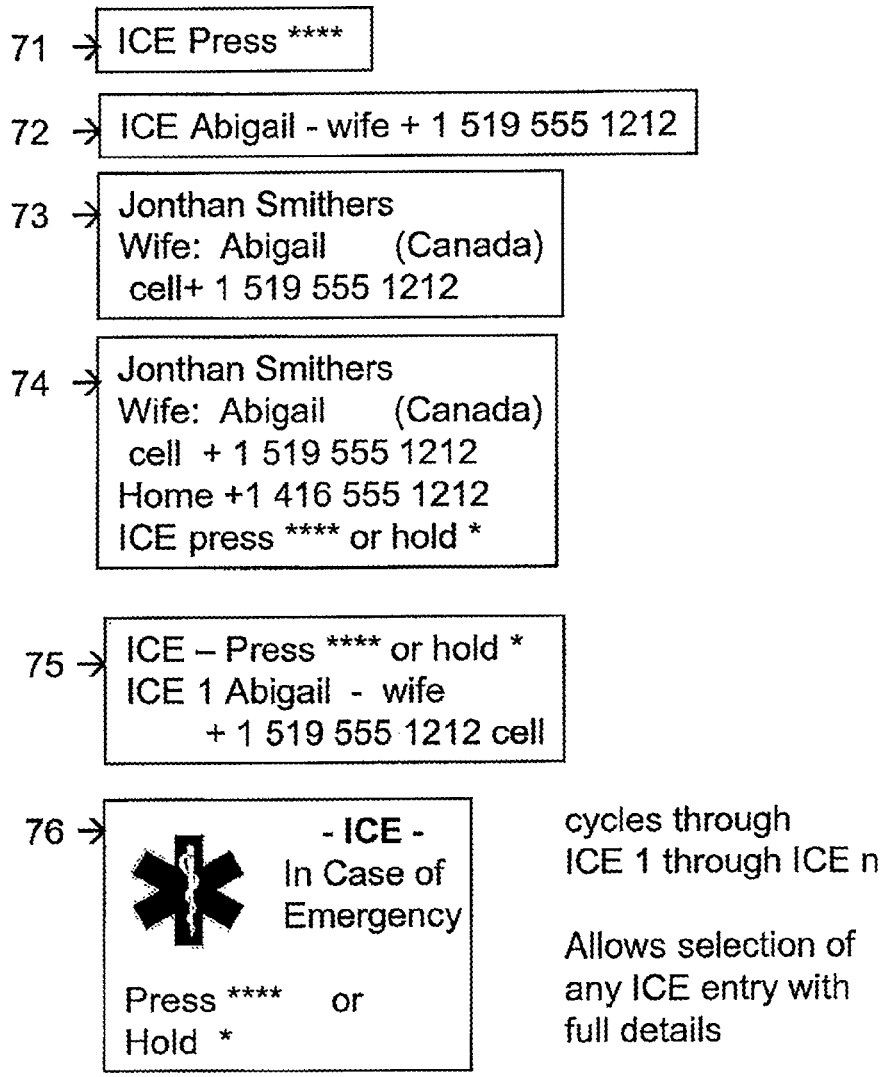
FIGS. 4a and 4b illustrate various display screens, in accordance with an embodiment of the information access system.
Figure 4B:
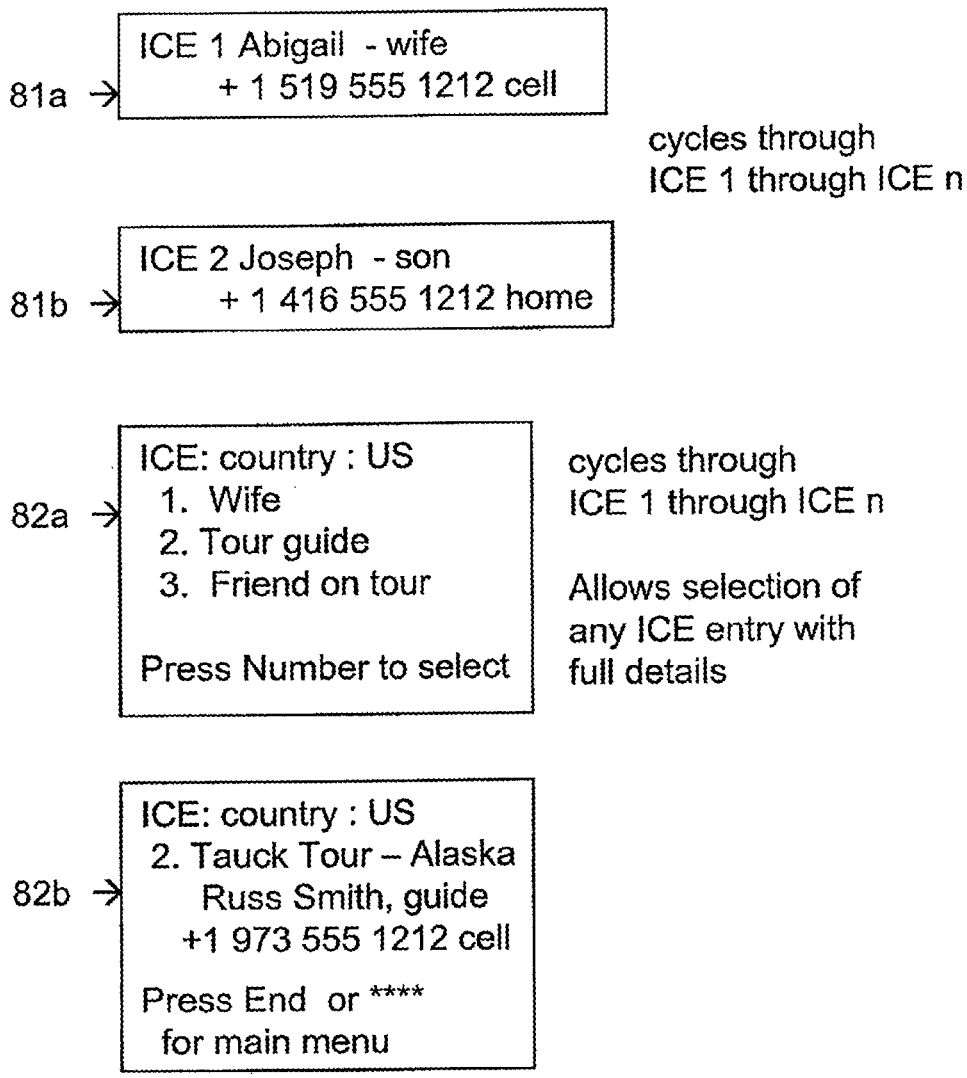

FIGS. 4a and 4b illustrate various display screens 70, 80 in accordance with an embodiment of the information access system 25. Referring to FIG. 4a various forms of idle screens 71, 72, 73, 74, 75 and 76 are illustrated for various portable devices. Preferably, the ICE idle screens are tailored to the size of the display and the device capability. A small display may only allow the display of the instructions to view the ICE information, as in 71. A display that is slightly wider 72 and/or larger 73 may allow the primary ICE contact to be displayed. An even larger display 74 or 75 allows for ICE information to be displayed together with instructions on viewing the ICE information. As the screen becomes larger, the amount of displayed information, if desired, may be increased. Alternately, should the device user prefer, the ICE idle screen may be set to only display instructions on how to access the ICE information as in 71 or 76. In idle screen 76 the screen cycles through ICE entry 1 through ICE entry N, where N is an integer greater than 1, and allows an ICE entry with full details.

Should the emergency medical team or first responders need additional ICE information (in the case where the first ICE contact is displayed on the ICE Idle screen), they could then follow the instructions and access the ICE information. Referring to FIG. 4b various forms of ICE display screens 81a and 81b, and 82a and 82b are illustrated for various portable devices. In display screen 81a and 81b, the screen cycles through ICE entry 1 through ICE entry N. The ICE 1 screen of 81a and 81b may cycle through alternate telephones of the person displayed, for example showing the cellular number of the wife Abigail 81a, then showing her work phone number, and then going to the second ICE contact 81b, ICE 2, and similarly cycling through that contact's phone numbers.

A more complex situation is illustrated in 82a and 82b, where the screen first lists ICE entry selections as shown in 82a and allows the selection of an ICE entry with full details as shown in 82b. For example, a device owner is on an Alaskan tour. He prefers that his wife be contacted first, the tour guide next, and a friend on the tour third. The device owner may have chosen the ICE idle display of 76, or could have simply chosen the screen of 82a as the ICE idle screen. In either event, when the medical or emergency responders reach the screen shown in 82b after they have tried his wife, they may be able to conclude based on the location of the emergency (for example, if it occurs in the Los Angeles airport) that he has either completed or not yet started his tour, and look for additional ICE contacts near Los Angeles. They could also see if he has his own contact information stored in ICE and take that into account in their next steps. If, alternately, the emergency occurred in Alaska, they could try and contact the tour guide if they were unable to contact his wife. All of these options that are provided by way of example, illustrate the versatility of the information access system 25.

Figure 5:
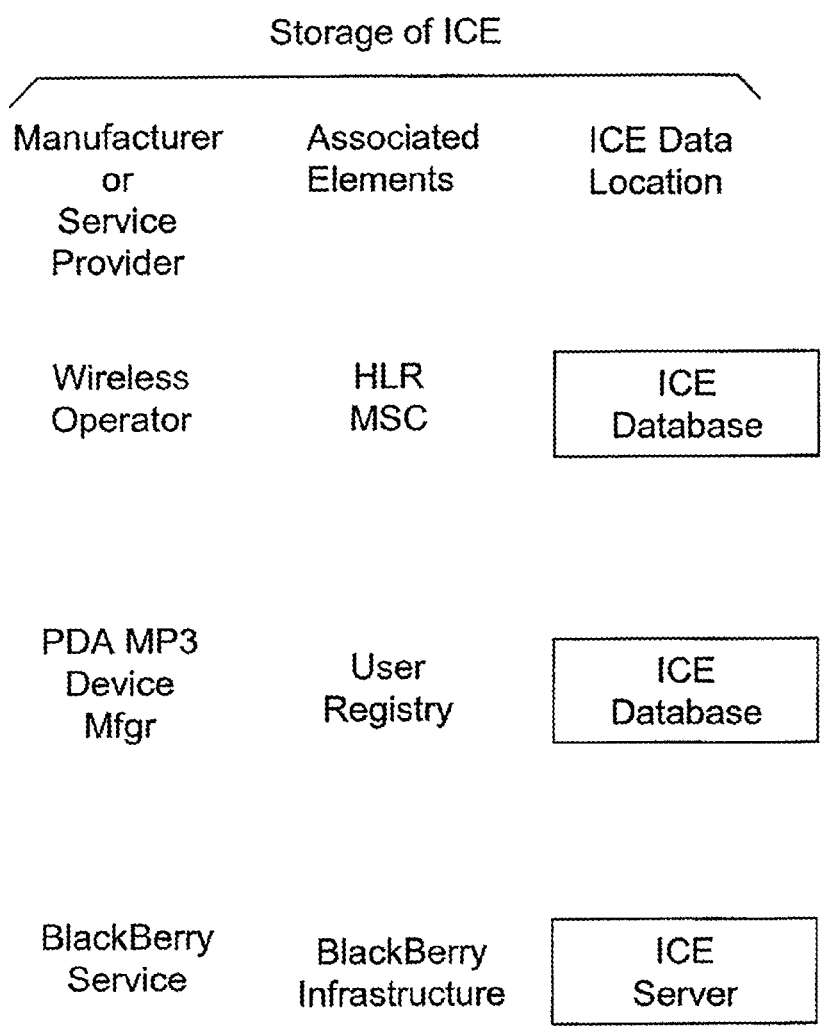
FIG. 5 illustrates an ICE data storage chart for various portable devices, in accordance with an embodiment of the information access system.

Referring to FIG. 5 there is illustrated an ICE data storage chart 90 for various portable devices, in accordance with an embodiment of the information access system 25. Storage of ICE information is dependent upon the type of portable device. Examples are shown for wireless and non-wireless devices. The ICE database may be operated by one or more of a cellular or wireless system operator, a PDA or MP3 manufacturer, the BlackBerry infrastructure, and/or an individual user on user's computer (for backup).

A prime source of ICE data for emergency responders is the user's portable electronic device. FIG. 5 demonstrates that ICE data may be readily stored in a database, providing both backup (for example, rapid loading of ICE information into a replacement device when the original device fails or is lost) and an alternate source of the data for emergency responders. Devices with keyboard and communications capabilities are also capable of updating the ICE data in these databases.

For a cell phone user, that user's ICE data is associated with (retrievable through) their cellular subscription. Preferably, the subscription information is located in the home location register (HLR) or mobile switching center (MSC). The user of a Wi-Fi™ phone that is registered with a Wi-Fi provider may similarly have their ICE data stored by the service provider and accessible through that registration.

Portable devices that do not have a cellular or similar subscription, such as a PDA or MP3 player or other portable device, may be in the device manufacturer's registry of users. Thus the device manufacture's registry could permit ICE data to be similarly stored in the manufacturer database which would enable the same backup and access for use in replacement devices, etc., as described above for cellular devices.

In a similar manner, BlackBerry devices are identified by a personal identification number (PIN) (and in most cases, also by an International Mobile Equipment Identity (IMEI) or Electronic Serial Number (ESN)). The use of the PIN enables the BlackBerry infrastructure to associate a user's ICE data with the PIN of the user's BlackBerry. Note also that for BlackBerry users, their ICE data may be stored both by the wireless operator and by the BlackBerry service, or by one of them through a coordinated service arrangement.

Figure 6:
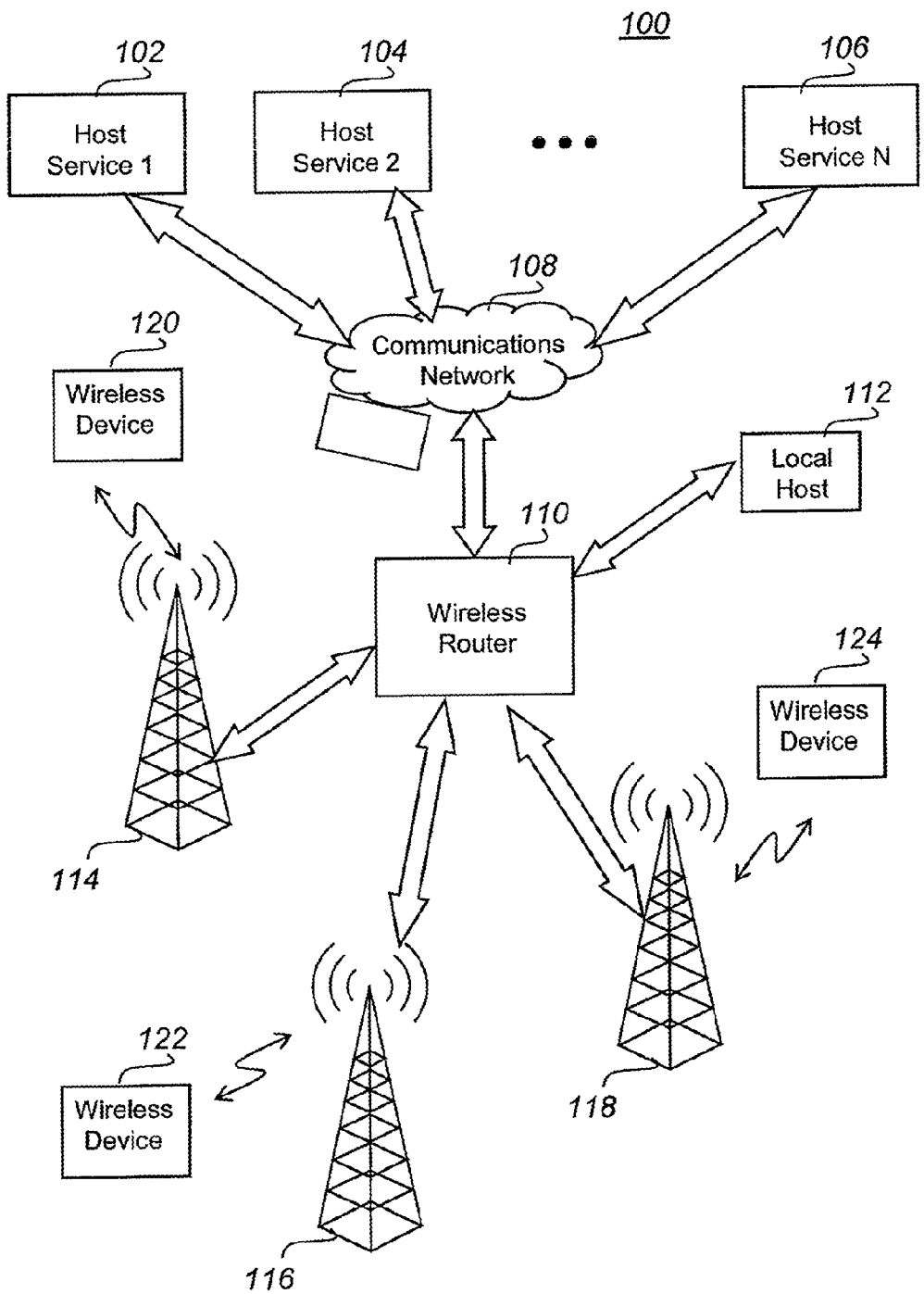
FIG. 6 illustrates in a network diagram a wireless network environment in which exemplary wireless devices can be operated, in accordance with an embodiment of the information access system.

Referring to FIG. 6 there is illustrated in a network diagram a wireless network environment in which exemplary wireless devices can be operated, in accordance with an embodiment of the information access system 25. In FIG. 6, the exemplary wireless communication system 100 includes a plurality of host services (three shown, 102, 104, and 106), each of which may have a plurality of services such as, but not limited to, email, calendar, Internet web browser, and other applications, available to their subscribers. In this particular example, the host services 102, 104, and 106 are typically configured as servers, each containing at least one processor and a storage means, and each using a network interface over which communication with a communication network 108 such as the Internet can be effectuated. The host services 102, 104 and 106 send and receive messages over communications network 108 to and from wireless router system 110 allowing communication between the host services 102, 104, and 106 and the wireless router system 110.

The wireless router system 110 is connected to a plurality of wireless networks (three shown, 114, 116, and 118), each of which may support a plurality of mobile devices (one in each wireless network is shown, 120, 122, and 124). The wireless networks 114, 116, and 118 may be a cellular telephone network, such as a global system for mobile communication (GSM) network, or a code division multiple access (CDMA) network, a two-way paging network, a short range wireless network such as Bluetooth and IEEE 802.11 compliant network, and others. The mobile devices 120, 122, and 124 are devices compatible with the corresponding wireless network.

Mobile communications devices 120, 122 and 124 are two-way communication devices with advanced data communication capabilities having the capability to communicate with other mobile devices or computer systems, such as host services 102, 104, 106, through a network of transceiver stations, including wireless router 111 and communication network 108. The mobile communication devices 120, 122 and 124 may also have the capability to allow voice communication. Depending on the functionality provided, it may be referred to as a data messaging device, a two-way pager, a cellular telephone with data messaging capabilities, a wireless Internet appliance, or a data communication device (with or without telephony capabilities). The preceding list is not meant to be exhaustive; the embodiments described herein can be practised with any type of mobile device, whether listed above or not.

One of the primary purposes of host services 102, 104 and 106 is to process information received from other sources, such as mail servers (not shown) and mobile communications devices 120, 122, 124, and send the information on to the appropriate recipient, typically a different host service 102, 104, 106, mail server or mobile communications device 120, 122 or 124. Host services 102, 104 and 106 are configured to send and receive email messages and as such typically communicate with a mail server. Mail servers could include for example a Microsoft™ Exchange™ server, a Lotus™ Domino™ server, a Novell™ GroupWise™ server, an Internet Message Access Protocol (IMAP) Server, a Post Office Protocol (POP) Server or a webmail server or any other mail server as would be understood by those in the art. The host services 102, 104 and 106 also contain a software module, which executes in their processor to achieve the desired sending and receiving of messages as well as the appropriate processing of information. In one embodiment, the software module of each host service 102, 104, 106 is a messaging module, the messaging module is adapted to receive messages from at least one external mail server, send messages to mobile communications devices 120, 122, 124, receive messages from the same mobile communications devices and send messages to the at least one external mail server(s). The at least one external mail server(s) could also be at least one mobile data server(s) for example. The wireless router system 110 may also be directly connected to a host service, such as a local service 112, without the communication network 108. In another embodiment, it is possible for host services 102, 104 and 106 to communicate directly with mobile communications devices 120, 122 and 124. In this embodiment, host services 102, 104 and 106 are capable of addressing communications to mobile communications devices 120, 122 and 124 without the aid of the wireless router system 110.

Figure 7:
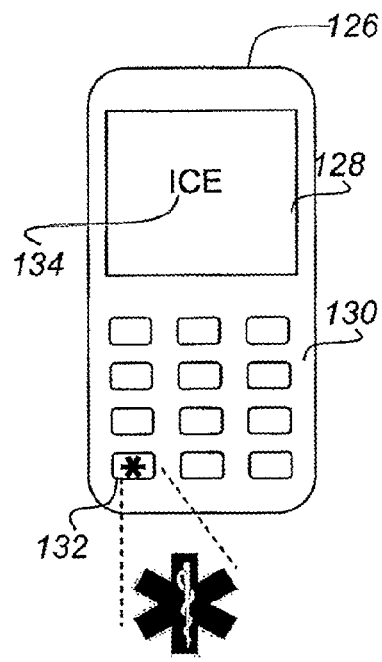
FIG. 7 illustrates an example of mobile communications device for providing ICE information, in accordance with an embodiment of the information access system.

Referring to FIG. 7 there is illustrated an example of mobile communications device 126 for providing ICE information, in accordance with an embodiment of the information access system 25. The mobile communications device 126 may be a cell phone and includes a display screen 128 and a keyboard 130. The keyboard 130 includes a key 132 bearing an ICE indicia. In the present example the ICE indicia is shown as a asterisk having squared points, representative of the "Star of Life" certification mark of the National Highway Traffic Safety Administration (NHTSA) of the United States of America. This symbol has been adopted by emergency medical services organizations around the world, with the star portion being added to other design components in various countries.

In operation, in the event of an emergency, with the owner of the mobile communications device 126 in an unconscious or semi-conscious state, the mobile communications device 126 may be in a locked condition, thereby preventing third parties from accessing phone lists of friends or relatives. When the key 132 bearing a stylized indicia is depressed, ICE information 134 is displayed. The locked display 128 could indicate existence of 'ICE' info by displaying 'ICE' 134 and any symbol chosen to represent the availability of ICE information.

Figure 8:
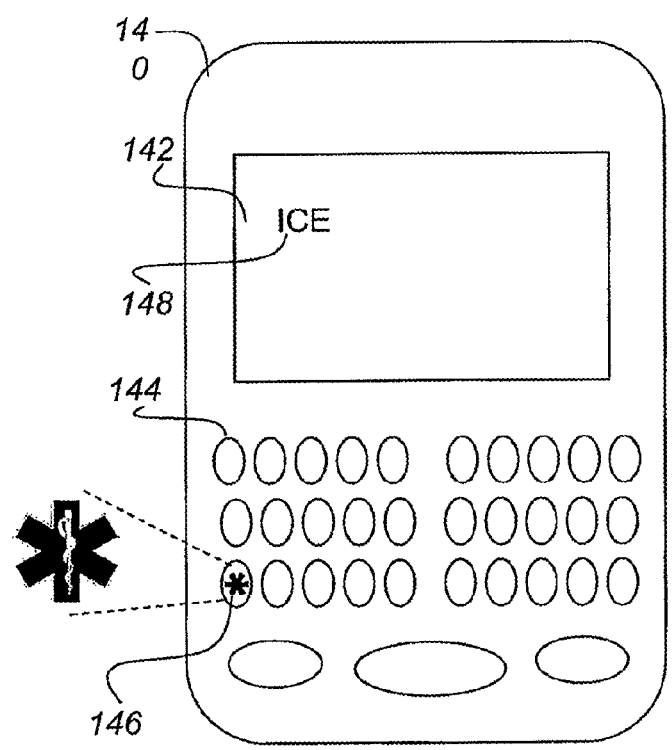
FIG. 8 illustrates another example of a mobile communications device for providing ICE information, in accordance with an embodiment of the information access system.

Referring to FIG. 8 there is illustrated another example of a mobile communications device 140 for providing ICE information, in accordance with an embodiment of the information access system 25. The mobile communications device 140 may be an electronic mail device and includes a display screen 142 and a keyboard 144, both of which are larger than the mobile communications device 126 of FIG. 7. The keyboard 144 includes a key 146 bearing a stylized indicia. Such devices with larger displays could provide further information, including directions to display the 'ICE' information.

Figure 9:
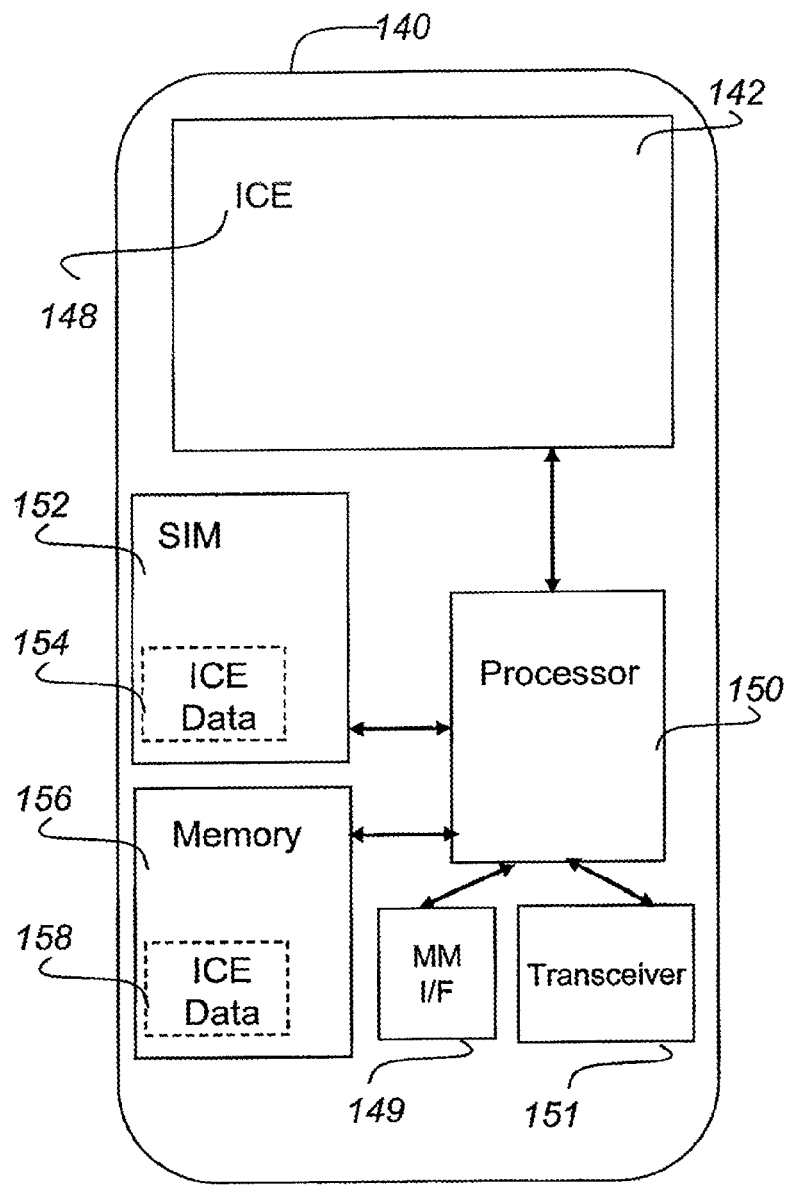
FIG. 9 illustrates a more detailed example of the mobile communications device for providing ICE, in accordance with an embodiment of the information access system.

Referring to FIG. 9 there is illustrated a more detailed example of the mobile communications device 140 for providing ICE, in accordance with an embodiment of the information access system 25. The mobile communications device 140 includes a display screen 142 for displaying ICE information 148, a man-machine interface (MM I/F) 149, a processor 150, a transceiver 151 and a SIM card 152. The SIM card 152 includes ICE data 154. For devices without a SIM card 152, but having a memory 156, ICE data 158 is stored therein for access by the processor 150. The ICE information can be stored in different ways. For example, the ICE information may be stored as a separate list for ICE, or as a portion of a standard phone list with an ICE field added.

Information in portable devices are often locked for security reasons. Preferably, once ICE information is loaded into a portable device, a) there is an indication that the device may be ICE-capable, b) there is ease of access by first responders and emergency personnel, c) there is ease of use (of ICE information), d) there is protection of non-ICE PAB (personal address book) and other information if the device was locked, e) there is separation of the device-locking and the ICE access functions, so that access to ICE does not compromise the basic device and SIM (if there is one) security.

Man-machine user interface events may be designated to unlock ICE information. For example, pressing a "*" key (asterisk or 'star of life') three or four times, or holding a "*" key (asterisk or 'start of life') for two seconds. Preferably, one of these examples may be used as a standard for all portable devices.

Advantageously, the asterisk has some similar characteristics as the 'star of life', and is common to many keyboards; the asterisk is a required key according to 3GPP specification. It is preferred that there be no adverse effect on the device by use of the ICE access method. To provide an increased ease of use, it is further suggested that, when the device is a cell phone and is in the locked state or idle state three "*" (asterisks) or 'star of life' presses opens the device to the ICE information.

As some devices do not have a keypad, there may not be the "*" key available. Examples of such devices include MP3 players and other portable music devices, and cell phones for children that do not have a cell phone keypad but use a specially-adapted user interface. Such devices typically have some form of man-machine interface (for example an iPod™ has a thumb wheel and select button) that allows access to menus. In those cases ICE information can be positioned as a menu item. Further aspects of the present disclosure which are beneficial to devices which do not have a keypad are described in detail below with reference to FIGS. 15 to 21.

Figure 10:
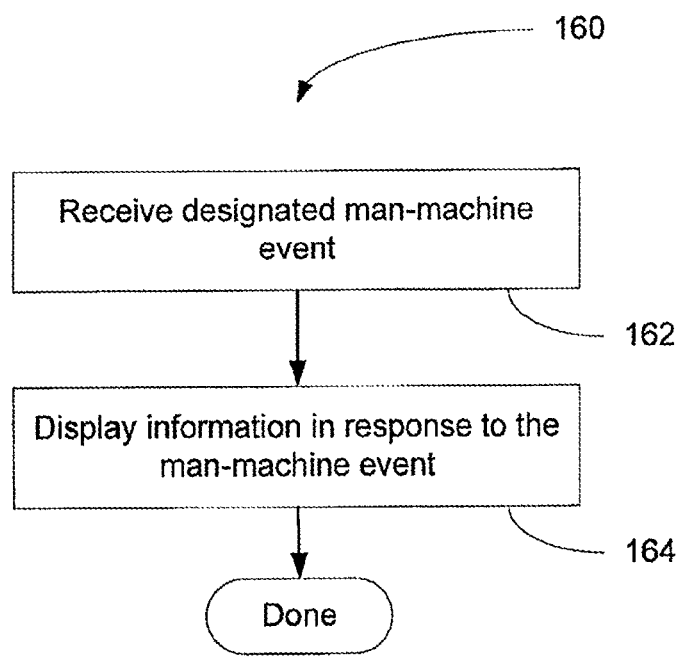
FIG. 10 illustrates in a flowchart an example of obtaining information from a locked mobile device, in accordance with an embodiment of the information access system.

FIG. 10 shows in a flowchart an example of obtaining information from a locked mobile device (160), in accordance with an embodiment of the information access system 25. The method (160) begins with receiving a designated man-machine event (162). Next, information is displayed in response to the man-machine event (164). The information is displayed despite the portable device being locked. The method (160) is done. Other steps may be added to this method, including obtaining information from a local or remote repository. The method (160) may be implemented in the processor of the portable device 16 or the man-machine interface module 22. Advantageously, this method may be used to obtain ICE information from the locked device. This method may be used to obtain other information as well. Subsequent examples of embodiments of methods described below recite the term "ICE information". Other information may be suitably used in place of "ICE information".

While most cellular wireless devices now use a SIM or equivalent, some do not. An example of cell phone without a SIM or like module is a CDMA cell phone. (Note that some device models may have a RUIM). An example of a non-cellular wireless device that the user may carry with them is a Wi-Fi phone.

The information access system 25 and method (160) may be implemented in portable devices, including wireless devices, that the user would often carry with them, whether or not a SIM or equivalent is used. For example, the information access system 25 and method (160) may be implemented in cell phones, unlicensed Wi-Fi (wireless LAN) phones, satellite phones (Iridium and others), iPods, PDAs and other portable electronic devices without wireless communications.

Figure 11:
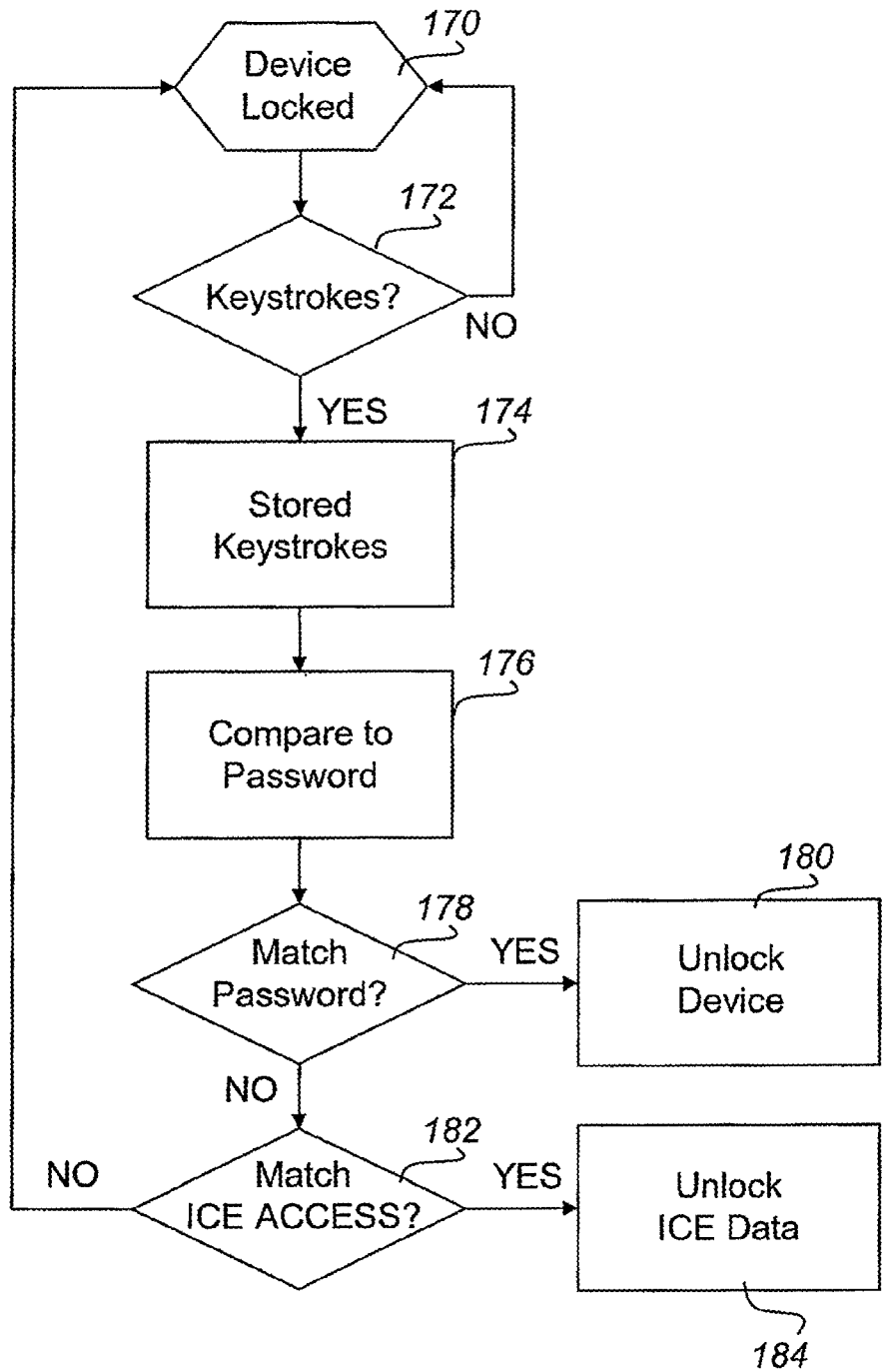
FIG. 11 illustrates in a flowchart an example of a method of unlocking a wireless device for providing ICE, in accordance with an embodiment of the information access system.

Referring to FIG. 11 there is illustrated in a flowchart an example of a method of unlocking a wireless device for providing ICE, in accordance with an embodiment of the information access system 25. A wireless device is locked, as represented by block 170. Keystrokes are detected at decision block 172 and stored at process block 174. The keystrokes are compared to the device users password at process block 176, if matched 178 the device is unlocked as represented by process block 180. If not matched 178, the stored keystrokes are compared to ICE access at decision block 182. If matched 182, access to the 'ICE' information is allowed 184.

Depending upon the portable device age various keystrokes could be used for accessing the information. Preferably, one could use ICE or 423 as the 'unlock' code to display the 'ICE' information, or use '*' key, either repeatedly, or holding for an extended period. The '*' indicia may or may not be replaced with a representation of the "Star of Life" as described above.

The locked display would indicate the existence of 'ICE' info by displaying 'ICE' and any symbol chosen to represent it. For example, the 'Star of Life' may be displayed or the representation of 'Star of Life' may be used instead of the '*' on the asterisk key. This could be a six-pointed star, with square ends on the six points or the actual 'Star of Life'.

Devices with larger displays, such as the one shown in FIG. 8 could provide further information, including directions to display the 'ICE' information. Preferably, for new devices, and for those legacy devices where it is possible, the ICE indicia indicates whether there is ICE information in the device. For example, a bold symbol (indicia) would show that there is ICE information, a "greyed-out" symbol would show absence of information. An alert to the user after the end of a trip (date has been reached) can also be displayed. This could be done at each turn-on, or by some other selected algorithm. Preferably, included information that is displayed could include more than a name and phone number according to user preferences.

Figure 12:
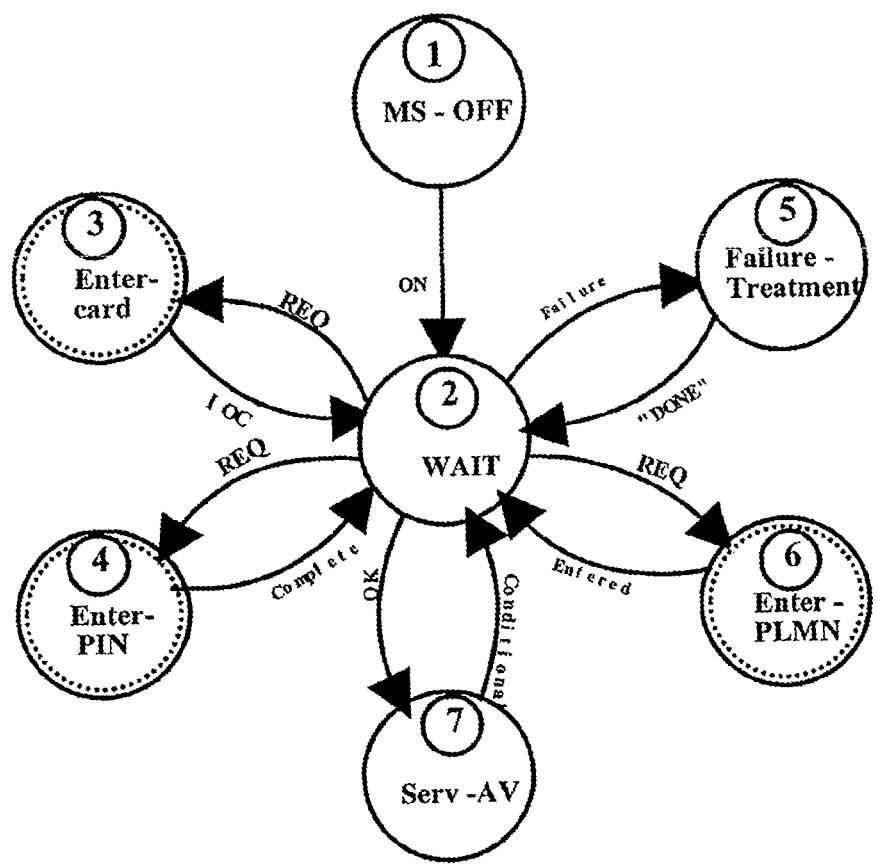
FIG. 12 illustrates in a graph diagram a typical Mealy graph 200 of a user equipment access procedure.

FIG. 12 illustrates in a graph diagram a typical Mealy graph 200 of a user equipment (UE) access procedure. The Mealy graph 200 comprises 7 states that are known in the portable device communication industry: MS—Off (1); Wait (2); Enter-card (3); Enter-PIN (4); Failure-Treatment (5); Enter-PLMN (6); and Serv-AV (7).

Figure 13:
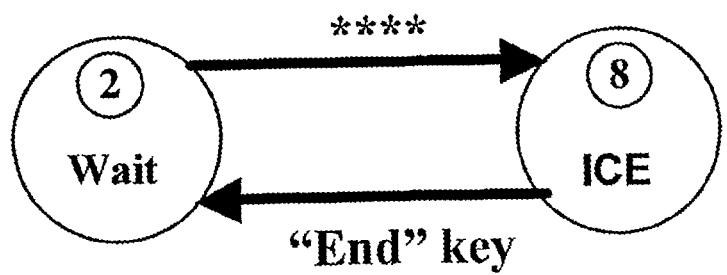
FIG. 13 illustrates in a graph diagram an amendment that can be added to the Mealy graph of FIG. 12, in accordance with an embodiment of the information access system.

FIG. 13 illustrates in a graph diagram an amendment that can be added to the Mealy graph 200 of FIG. 12, in accordance with an embodiment of the information access system 25. An ICE state (8) can be added. A sequence of key strokes unlocks the system from the wait (2) state and places the system in the ICE (8) state. Preferably an "end" key is used to exit the ICE state (8) and go back to the wait state (2).

The following is a description of the states of the UE access procedure:

| | | |
|---|---|---|
| 1) | UE-OFF: | The UE is in OFF-condition. This means that the equipment is not active as an UE in a PLMN. |
| 2) | WAIT: | Waiting for the completion of the UE access conditions, which are related to the type of UE and to the PLMN, where in the UE is roaming (e.g. location updating). |
| 3) | ENTER CARD: | Request for entering of the subscriber card, (e.g. when no built in SIM module is available). |
| 4) | ENTER PIN: | Request for entering of the correct PIN. |
| 5) | FAILURE TREATMENT: | Waiting for removal the actual failure condition. |
| 6) | ENTER PLMN: | Request for selection of PLMN. |
| 7) | SERV-AV: | The UE is in a ready state. PLMN services are available to the user. |
| 8) | In case of emergency (ICE) | The UE is unlocked and ICE information is available. If the UE had been locked in the previous state, then only the ICE information is available |

The following is a description of the transitions between UE access states

| | |
|---|---|
| ON: | The equipment becomes active as an UE in a PLMN. |
| REQ: | A request for user activity. |
| IOC: | Insertion of a subscriber card with SIM/USIM-module. |
| COMPLETE: | The PIN has been entered. |
| ENTERED: | A PLMN choice has been done. |
| FAILURE: | A failure condition has occurred in any other state during the UE access procedures. |
| CONDITIONAL: | One of the conditions the UE is waiting for in WAIT state has been lost. The UE goes back to the WAIT state. |
| "DONE": | The UE access failure condition has been corrected. |
| OK: | All the conditions the UE is waiting for in the WAIT state are accomplished. |
| ICE unlock: | The UE enters the in case of emergency (ICE) state. |
| "Off" key: | The UE goes back to the WAIT state. |

Preferably, FIGS. 12 and 13, and the above descriptions of states and transitions define the requirements for a preferred standard for the Man-Machine Interface (MMI) of the user equipment incorporating ICE access procedures. The preferred standard allows anyone to access the ICE information stored on the (U)SIM or on the UE. The use of the procedures in the preferred standard does not make other information (for example, non-ICE entries in the phonebook) visible. The procedure of the preferred standard operate whether or not the SIM PIN is locked and whether or not the handset is locked. In the preferred standard, the unlocking of the mobile device storing ICE information occurs when the mobile device is in an idle state and any alphanumeric key is pressed three times or any alphanumeric key is depressed for two seconds.

The following description describes an example of the storage of ICE information on a SIM card.

Preferably, ICE information is placed on the SIM card. This enables the user (through the operator) to download the information to the SIM (or USIM). The device may or may not make a copy of the ICE information. Preferably, the device makes a copy of the ICE information and retains the copy on the device. New files may be added to the SIM card. For example, an existing phone address book may have a limited number of fields. Preferably, one or more new files containing the ICE information is used, that has the information and fields to be tailored to ICE use. Preferably, the ICE files alone are unlocked through the use of a mechanism available to emergency responders, and this use of separate files (rather than files or records within existing, general address books) ensures that the ICE unlocking does not unlock or otherwise affect the main address book. Further, this use of separate ICE information files allows the ICE files to evolve. Furthermore, a single standardized approach for new devices can be used.

Although, as implied above, ICE information can be placed in a newer-style address book file (where ICE information or entries is "integrated" with other conventional address book entries such that the ICE information can be accessed from a locked or unlocked state while other non ICE-related information in the address book file remain locked when the device is in a locked state), such storage does not provide the basis of a standardized approach where the ICE information is maintained separately from the address book file. Moreover, having ICE information continue to be identified only by "ICE" in front of the name in the address book entry would prevent the advantages of the separate ICE files from being achieved. Without a standard, each cell phone [or portable device] manufacturer could use different formats and techniques, thereby limiting or preventing easy transfer of a user's ICE information from one handset or device to another handset or device. Advantageously, maintaining ICE information separately from the address book file and in a standardized form allows for the transfer of the user's ICE information by moving the user's SIM card to the new wireless device. Preferably, a standard is set for ICE information for SIM cards so that the files are placed in a new dedicated file (DF), for example, $DF_{ICE}$. Preferably, this DF would have two elemental files (EFs): a) $EF_{IU}$ (ICE User) and b) $EF_{IC}$ (ICE Contacts).

The ICE User file would provide the [cell phone] user's information:

| | |
|---|---|
| Name | |
| Address | |
| Country | |
| Time Zone | |
| Language(s) | For emergency personnel |
| Phone number | Number split (space) so that the country code is clearly identified |

| | |
|---|---|
| Mobile number | Number split (space) so that the country code is clearly identified |
| Traveller's group info | Identifies the User as travelling with a group. Provides the starting and ending date of the tour, so that emergency personnel will know whether it is current. |
| Blood type | |
| Comment | User may wish to add information on medical condition or other instruction for emergency personnel. User may also leave blank. |

The user who travels presents additional issues regarding ICE information. The location that the user visits may have a different language, or both a different language and a different alphabet [for example, Western alphabet vs Japanese, Chinese or other scripts]. The issues may be addressed in several steps.

For travel within countries using a Western alphabet, the field headings may be provided in multiple languages, i.e., user's language and English, or user's language, English, and language of frequently-visited countries. The use of multiple languages in the headers allows the emergency responders to determine which telephone numbers are for work (business), home and mobile. The use of multiple languages in the headers also indicates to the emergency responders the relationship of the ICE contact, i.e., spouse, brother, friend, physician, tour guide. The headings would preferably be pre-programmed in at least the user's language and English with the ability for the emergency responder to choose which language is most useful to them. In this example, the user's ICE information and the contacts' ICE information is entered in the user's native language. With the field headings and the telephone numbers available to, and understood by, the emergency responders, most or all of the goal of ICE information is achieved.

A more difficult situation occurs when the user with a Western language travels to a country with a different alphabet or script. English (and likely to a lesser degree other Western languages) may enable emergency responders to have access to at least the field headings (if a person conversant in that Western language is available) and the telephone numbers. For a user (with a Western language) that will be in a country using a non-Western language for an extended time, it is preferable to have both the field headings and the information within the fields translated to the language of the country so that emergency responders have access to all of the information without the need for a translator. Similarly, a user (with a non-Western language) that will be in a country that uses a Western language would need to have both the field headings and the information within those fields translated to English or other appropriate Western language.

Preferably, the provision of field headings in several languages (using both Western and non-Western languages) is available to the user when the ICE information is initially input and when the user's itinerary calls for additional languages. This may be accomplished without knowing the name and details of the user and the user's ICE contacts. The languages that are available are preferably indicated so that the emergency responders may select the most useful language. The case where the names and other details must be translated between Western and non-Western languages can be handled individually.

The user may choose not to provide all information, for example, excluding the street address and city from the address. Preferably, the Traveler's group info dates use an alphabetic abbreviation for the month, so as to prevent misunderstandings. When the Traveler's group info date has expired, the user will be alerted, and asked whether the tour or travel has been completed or has been extended, i.e., (a) delete the traveler's group info for that trip and delete the association with the travel in the contacts entry (and whether that contact should be deleted), or (b) extend the date of the tour or trip in the Traveler's group information.

The ICE Contact file would provide information on the people or groups that emergency personnel may wish to contact.

| | | |
|---|---|---|
| Name | | |
| Relationship | | Relationship to user. Mom, spouse, brother, friend, physician, travel-group member, tour director, . . . |
| Address | | (optional) |
| Time Zone | | If different from User |
| Country | | |
| Language(s) | | For emergency personnel |
| Phone number | - h | Number split (space) so that the country code is clearly identified |
| | - w | Number split (space) so that the country code is clearly identified |
| Mobile number | | Number split (space) so that the country code is clearly identified |
| Comments: | | Could be used for IM, or for other comments. Could also be used to indicate additional fields have been added. |

Travelling with user? Indicates that this contact is travelling with the user Headings (when displayed) would preferably be in user's language and English or possibly other second language. The user may choose not to provide all information. Preferably, organizations, such as MedicAlert, would also be included in the contacts. Preferably, the user is able to prioritize the order of the contacts.

The following input techniques can be used for ease of use, insertion and updating of information within the wireless device:
  A. A user enters information online into operator web page. In this scenario the operator maintains database and forwards information OTA (over-the-air) to the SIM.
  B. Optionally, a user may enter information via personal computer (PC)-UE connection and cable.
  C. A user enters information via PC-UE using Bluetooth or other wireless connection.
  D. A user enters information via keyboard (TAP).

To display ICE information on a locked device such as a locked phone, separate DFs and EFs in the SIM are used to store ICE related information such as the user's home information, contacts, traveler's information and related information separately from the usual address book entries. This segregation of ICE information in specific ICE-oriented files enables the ICE information to be unlocked while the usual address book entries and other data remain locked and inaccessible.

To deal with limited space in each SIM address book entry, 'ICE' information is transferred from SIM/USIM to a mobile equipment (ME).

For the updating of information, the ME manages access to the information.

When a user obtains a new cell phone, the registration or enabling process will alert the user that ICE information should be entered. Should the user place an already-registered SIM in the wireless device, the user would preferably be asked if that ICE info (already on the SIM) is accurate and up-to-date.

When a user obtains another SIM, the handset and SIM are synchronized. The SIM may not have the DF and EF 'ICE' files, or it may have the DF and EF 'ICE' files without any information in them. Further, the another SIM may be a permanent SIM for the user (at least for a period of time), or the SIM may be a temporary loan for a (possibly brief) period from an associate or from the user's enterprise. If the SIM does not have any 'ICE' information contained in it, then presumably the information from the handset could be used, and the question "Keep 'ICE' information on <name of user, from ICE info> from the handset, and write to the SIM?" could be prompted to the user. If the user selects 'No', then the user could be prompted to insert 'ICE' information which would be placed in the SIM files and then copied to the handset overwriting the previous information.

Figure 14:
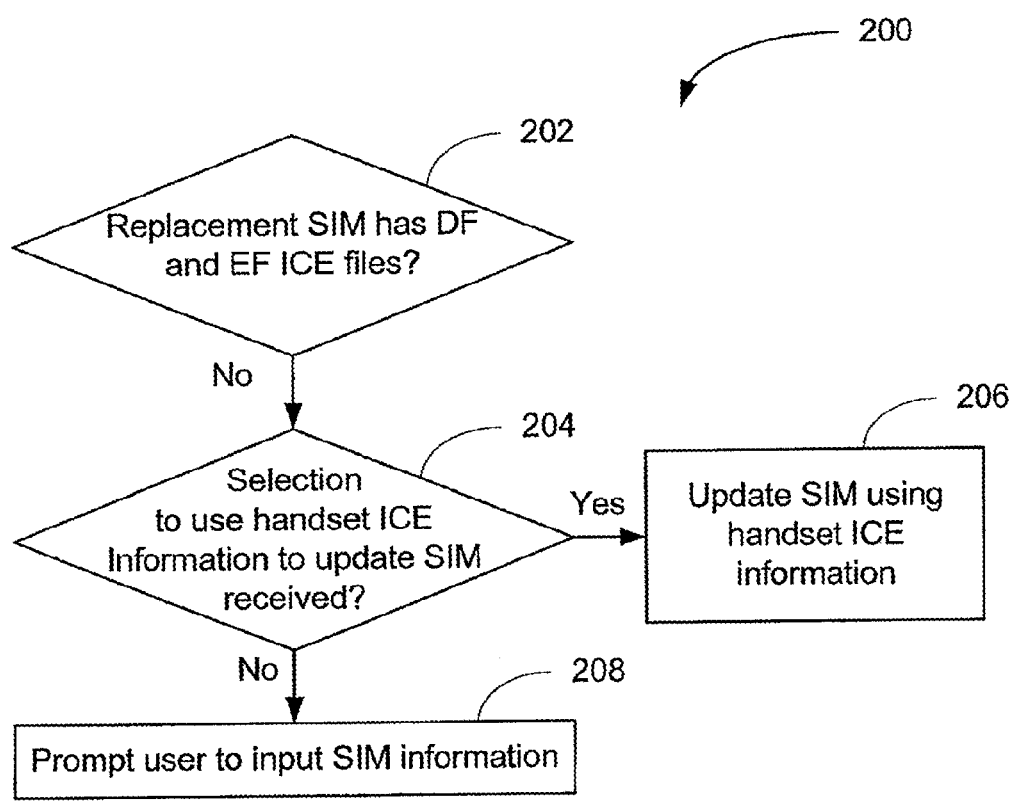
FIG. 14 illustrates in a flowchart an example of a method of synchronizing a handset and SIM, in accordance with an embodiment of the information access system.

FIG. 14 shows in a flowchart an example of a method of synchronizing a handset and a replacement SIM (200), in accordance with an embodiment of the information access system 25. If the replacement SIM does not have the DF and EF ICE file (202), or if the SIM's DF and EF ICE files do not have any information in them (202), then a message is displayed prompting a user to select if the user wishes to update the replacement SIM to reflect the ICE information on the handset (204). If so (204), then the SIM is updated with the information (206). If not (204), then the a message is displayed prompting a user input ICE information to be stored in the SIM (208).

Legacy wireless devices that do not have special indicia can be programmed to access the information via other key strokes. For, example by typing use ICE or 423 as the 'unlock' code to display the 'ICE' information, or by using a '*' key, either repeatedly (e.g., three or four times), or pressing for extended period. The '*' indicia may or may not be replaced with the stylized indicia as described above.

New Devices and new SIMs, USIMs, ISIMs, RUIMs can be produced with the ICE capability built in.

If a legacy SIM is not ICE-enabled, the legacy SIM may have the DF and EFs added via an OTA (over-the-air) command from the operator. Many recent legacy devices are capable of loading games and other applications onto the handset (device). Many handsets are being produced that use Binary Runtime Environment for Wireless (BREW) or Java (or other "standardized" languages) as the programming language for such applications. Thus, operators and manufacturers could produce BREW or Java applications that would enable use of ICE (as described herein) on the device. It is further noted that, with the standardization of BREW, and the industry work towards standardization of Java for many handsets, that a single, e.g., Java ICE, application may be installable on many different models of handsets. The device, once the BREW or Java ICE application is installed, would then operate with the same capability as a handset manufactured with the ICE capability fully installed.

Devices such as the RIM BlackBerry™, having a mode where information is stored on the infrastructure thus enabling change to a new wireless device with the information (from the previous device) downloaded to the new device, may store the ICE information via the OTA backup. This enables change to a new wireless device even in the case where a SIM card is not used.

It has been described above that, for man-machine interfaces using a physical keyboard or keypad, the terms keyboard or keypad are used in the following interchangeably, it may be beneficial to allow access to emergency information upon the repeated pressing of a predetermined key. This is further described in the 3GPP TS 22.030 which is incorporated herein by reference. However, some portable devices do not include a physical keyboard and, in fact, many have very few physical buttons at all. Examples of such devices include smart phones and tablet devices having touch screens such as those shown in FIGS. 15 and 16. Other devices include both a physical keyboard and a touch screen and thus it would be advantageous to provide access to emergency information using physical keyboard as discussed above as well as with an alternative touch screen input method, as described below. Some devices temporarily obscure access to the physical keyboard through the use of a sliding keyboard for example. For these devices, it would be beneficial to provide access to the emergency information without having to first obtain access to the keyboard. Unless otherwise stated or implied from the described context, these portable devices are substantially similar to those described above, with the exception that they have a touch screen or other gesture detection mechanisms and may or may not include a physical keyboard or other physical keys or buttons. The concept of a WiFi™ only phone was described above. The principles of the present invention are equally applicable to any non-cellular device such as WiFi™ only tablet electronic devices. These devices are becoming increasingly popular in the modern marketplace.

Figure 15:
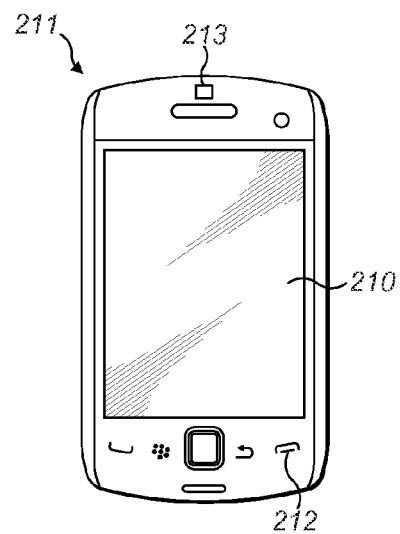
FIG. 15 illustrates an example of a smartphone portable electronic device having a touch screen interface.

FIG. 15 illustrates an example smartphone electronic device that includes a touch screen display 210 which acts as both an input interface (i.e. touch-sensitive overlay) and an output interface (i.e. display). The touchscreen display 210 may be constructed using a touch-sensitive input surface which is connected to an electronic controller and which overlays the display. The touch-sensitive overlay and the electronic controller provide a touch-sensitive input interface and the processor interacts with the touch-sensitive overlay via the electronic controller. In at least some example embodiments, the touch-sensitive overlay may have a touch-sensitive input surface which is larger than the display. For example, the touch-sensitive overlay may extend overtop of a frame which surrounds the display. In such example embodiments, the frame may be referred to as an active frame since it is capable of acting as an input interface. In at least some example embodiments, the touch-sensitive overlay may extend to the sides of the electronic device.

The exemplary device may include auxiliary I/O subsystems which include a vibrator for providing vibratory notifications in response to various events on the electronic device such as receipt of an electronic communication or incoming phone call, or for other purposes such as haptic feedback (touch feedback).

In at least some example embodiments, the electronic device also includes a device orientation subsystem including at least one orientation sensor which is connected to the processor and which is controlled by one or a combination of a monitoring circuit and operating software. The orientation sensor detects the orientation of the device or information from which the orientation of the device can be determined, such as acceleration. In some example embodiments, the orientation sensor is an accelerometer, such as a three-axis accelerometer. An accelerometer is a sensor which converts acceleration from motion (e.g. movement of the device or a portion thereof due to the strike force) and gravity which are detected by a sensing element into an electrical signal (producing a corresponding change in output). Accelerometers may be available in one, two or three axis configurations. Higher order axis configurations are also possible. Accelerometers may produce digital or analogue output signals depending on the type of accelerometer.

An orientation sensor may generate orientation data which specifies the orientation of the electronic device. The orientation data, in at least some example embodiments, specifies the orientation of the device relative to the gravitational field of the earth. In some example embodiments, the orientation subsystem may include other orientation sensors, instead of or in addition to accelerometers. For example, in various example embodiments, the orientation subsystem may include a gravity sensor, a gyroscope, a tilt sensor, an electronic compass or other suitable sensor, or combinations thereof. In some example embodiments, the device orientation subsystem may include two or more orientation sensors such as an accelerometer and an electronic compass.

The electronic device may also include one or more cameras. The one or more cameras may be capable of capturing images in the form of still photographs or motion video. In at least some example embodiments, the electronic device includes a front facing camera. A front facing camera is a camera which is generally located on a front face of the electronic device. The front face is typically the face on which a display is mounted. That is, the display is configured to display content which may be viewed from a side of the electronic device where the camera is directed. The front facing camera may be located anywhere on the front surface of the electronic device; for example, the camera may be located above or below the display. The camera may be a fixed position camera which is not movable relative to the display of the electronic device and/or the housing of the electronic device. In such example embodiments, the direction of capture of the camera is always predictable relative to the display and/or the housing. In at least some example embodiments, the camera may be provided in a central location relative to the display to facilitate image acquisition of a face.

Referring now to FIG. 15, a front view of an example smartphone 211 is illustrated. The smartphone 211 is a cellular phone which offers advanced computing capability. For example, the smartphone 211 may have the ability to run third party applications.

In the example embodiment illustrated, the smartphone 211 includes a display 210, which may be a touchscreen display 210 which acts as an input interface 206. The display 210 is disposed within the smartphone 211 so that it is viewable at a front side of the smartphone 211. That is, a viewable side of the display 211 is disposed on the front side of the smartphone. In the example embodiment illustrated, the display is framed by a housing. The example smartphone 211 also includes other input interfaces 212 such as one or more buttons, keys or navigational input mechanisms. In the example illustrated, at least some of these additional input interfaces are disposed for actuation at a front side of the smartphone.

The example smartphone 211 also includes a front facing camera 213 which may be located vertically above the display 210 when the smartphone is held in a portrait orientation where its height is longer than its width. The front facing camera 213 is located so that it may capture images of objects which are located in front of and/or surrounding the front side of the smartphone 211.

Figure 16:
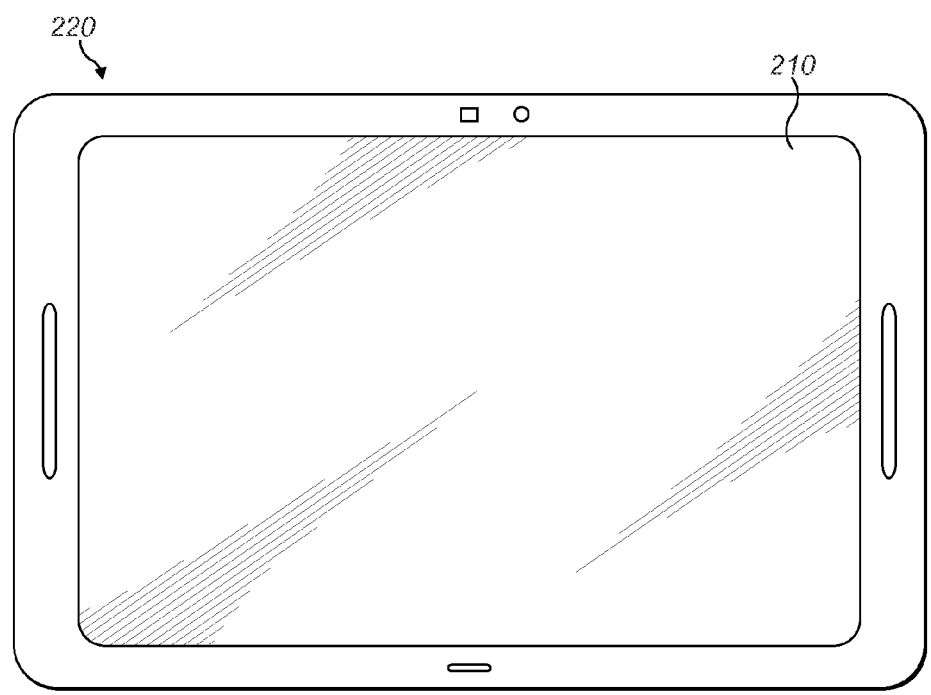
FIG. 16 illustrates an example of a tablet portable electronic device having a touch screen interface.

In at least some example embodiments, the electronic device may be a tablet computer. Referring now to FIG. 16, a front view of an example electronic device which is a tablet computer 220 is illustrated. The tablet computer 220 of FIG. 16 may include many of the same features and components of the smartphone 211 of FIG. 15. However, the tablet computer 220 of FIG. 16 is generally larger than the smartphone 211 of FIG. 15.

The tablet computer 220 includes a display 210, which may be a touchscreen display which acts as an input interface. The display is disposed within the tablet computer 220 so that it is viewable at a front side of the tablet computer 220. That is, a viewable side of the display is disposed on the front side of the tablet computer 220. In the example embodiment illustrated, the display 210 is framed by a housing.

A frame may surround the display 210. The frame is portion of the housing which provides a border around the display 210. In at least some example embodiments, the frame is an active frame. That is, the frame has a touch sensitive overlay which allows the electronic device to detect a touch applied to the frame thus allowing the frame to act as an input interface.

The device may be interchangeably referred to as a User Equipment (UE), Mobile Station (MS), hand-held, mobile phone, cellular phone, tablet computer, tablet, laptop, netbook, or ultrabook.

In portable devices having touch screen interfaces, one or more touches also known as touch contacts or touch events, may be detected by the input interface. In one example this is the touch-sensitive display screen and the touch-sensitive frame area. Multiple simultaneous touches may be detected by the interface. The processor may determine attributes of the touch, including a location of a touch, and may monitor any movement of the touch. Touch location and movement data may include an area of contact or a single point of contact, such as a point at or near a centre of the area of contact. The location of a detected touch may include x and y components, e.g., horizontal and vertical components, respectively.

As described above, to instruct a portable device to display ICE information, it is locked or not, the star key ("*") may be entered into the device three times. However, a star key is not always available on the device. Therefore, on such devices, a "*" key is not available to be pressed three times. Such devices, where the star key is not always available include: those without a physical keyboard; without a keyboard with a star key; without a button that could be interpreted as performing a function similar to the star key; where the star key is hidden on a slide-out keyboard; and, where the star key is on a separate device for example wirelessly connected to the device.

Furthermore, the means by which a locked or unlocked device screen is instructed to display the ICE information should be unique enough for the device to distinguish that means from other operations of the device or commonly used inputs.

Touch-screen devices may provide a virtual keyboard via the touch-screen. However, when the device is locked, a keyboard may not be present on the screen at all depending on the unlocking mechanism. For example, devices that are unlocked by entering a pattern, drawing a shape, connecting dots or pressing one or more specific physical keys on the device (if any exist).

Other touch-screen devices provide a virtual keyboard upon a certain action such as touching the screen or switching a switch. However, if the action is not well-known by users of a set of devices then it may not be apparent to users who may not be familiar with those devices.

Some devices may be set to always display a virtual-keyboard when locked although requiring such functionality may, in some instances, limit what a device vendor may offer as a solution for unlocking the device and constantly displaying a virtual-keyboard will drain any device's battery much quicker than those devices that automatically turn off the display on their screen.

First responders, that is those users first arriving at an emergency for example emergency services, family and friends, etc. need to be able to access the owner's ICE information in times of emergency easily and without delay, on any device regardless of whether it has an accessible keypad with a "*" key. Therefore, solutions are proposed herein to display ICE information on a device that has touch input and which may, but need not, have a keyboard/keypad.

In accordance with an exemplary embodiment of the present invention, The portable device may provide the ability to display the ICE contents by means of a predetermined gesture. The gesture may be made on or above the touch-screen, or in proximity to a detector depending on the detection means used. A gesture, for example as made by a user swiping the device's touch pad or touch screen with their finger or stylus, can be associated with the described repeated pressing of the star/asterisk (*) key three times and not interfere with common gestures expected by users across different devices e.g. touch-screen devices, etc.

In user interface design, certain touches or combinations of touches are recognised as gestures that lead to certain manipulations or operations of the interface or of the information presented on the display screen. By performing certain gestures on the input detectable area, a user can interact with the interface and control the applications and operating system of the electronic device.

A gesture can be described as any physical movement that a digital system can sense and respond to. A gesture can be defined by two properties, either individually or in combination. First, a gesture can be represented by a set of measured positions in space, unlike a single button which has an on-off actuation which measures a single location only. Input devices that detect motion and thus allow users to perform gestures include mice, digital gloves, camera tracking systems and touch screens. Second, the detected positions are measured over time. The way a gesture is drawn over time can change the meaning of a gesture. Thus, a definition of a gesture as used in the description herein can be thought of as a set of measured points in space and a corresponding set of time intervals between measurements. Hence, a touch event and the potential movement of that touch event can define a particular gesture.

Some interfaces have the ability to detect pressure in addition to location. Pressure may, for example, be determined by the area of a touch event increasing on a touch screen as the surface area of the touch widens with the increased pressure applied by the user.

Common gestures include: swipe, flick, pinch, punch or un-pinch, long-press, rotate, grab, tap or any of the above using multiple touch points, for example, a swipe may be performed with multiple fingers on a portable touch sensitive device. A sample of these exemplary gestures will now be described and these are illustrated in FIGS. 17A to 17K. In these illustration, a touch event is indicated by a circle around the finger, with the size of circle indicating the touch duration. The list of exemplary gestures is clearly not exhaustive. The exemplary gestures can be combined to form other gestures.

Swipe—an exemplary swipe movement, illustrated in FIG. 17A, may be a substantially horizontal movement of the input object maintaining contact with the detection surface, or while maintaining a similar distance away from the detection point.

Flick—an exemplary flick movement, illustrated in FIG. 17B, may be similar in nature to a swipe gesture, i.e. substantially horizontal. A flick gesture is often faster than a swipe and involves the input object being moved progressively away from the detection point during the horizontal movement, often at high speed.

Pinch—an exemplary pinch, illustrated in FIG. 17C, is a multi-point event comprising two distinct input objects starting substantially apart and moving progressively toward one another, i.e. two opposing translational movements.

Punch or un-pinch—an exemplary punch or un-pinch, illustrated in FIG. 17D, is a multi-point event comprising two distinct input objects starting substantially close or together and moving progressively apart.

Long-press—an exemplary long-press, illustrated in FIG. 17E, is an input object held for a prolonged period of time which may or may not be at a specific location on the input area.

Rotate—an exemplary rotate, illustrated in FIG. 17F, is a multi-point event comprising a first input object fixed in a particular location while a second input object moves in a substantially circular manner around the first input object.

Figure 17G:
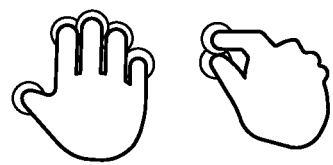

Grab—an exemplary grab, illustrated in FIG. 17G, is a multi-point event comprising at least three input objects starting substantially apart and moving progressively toward one another.

Figure 17H:
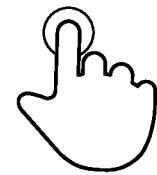

Tap—an exemplary tap, illustrated in FIG. 17H, is an input object moved quickly toward and away from the detection point.

Figure 17I:

Double Tap—an exemplary double tap, illustrated in FIG. 17I, is an input object moved quickly toward and away from the detection point twice in quick succession.

Figure 17J:
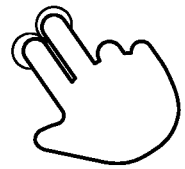
Figure 17K:
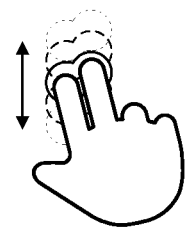

Two-finger Tap—an exemplary two-finger tap, illustrated in FIG. 17J, is two input objects moved quickly toward and away from the detection point substantially simultaneously.

Pan—an exemplary pan, illustrated in FIG. 17H, is two input objects moved substantially in the same direction at substantially the same time.

To detect a gesture, the device may comprise a gesture detection module, i.e. a sensor, a gesture identification module, i.e. a comparator, and a gesture actuation module, i.e. an actuator. The gesture detection module senses the touch event(s) and their movement and passes this information to the gesture identification module. The gesture identification module compares the received information to an array of stored information to determine the entered gesture. The determined gesture is then passed to a gesture actuation module which causes an action based on the gesture entered. For example, the pan gesture described above, when received by the gesture actuation module will often cause the display to scroll.

Figure 18:
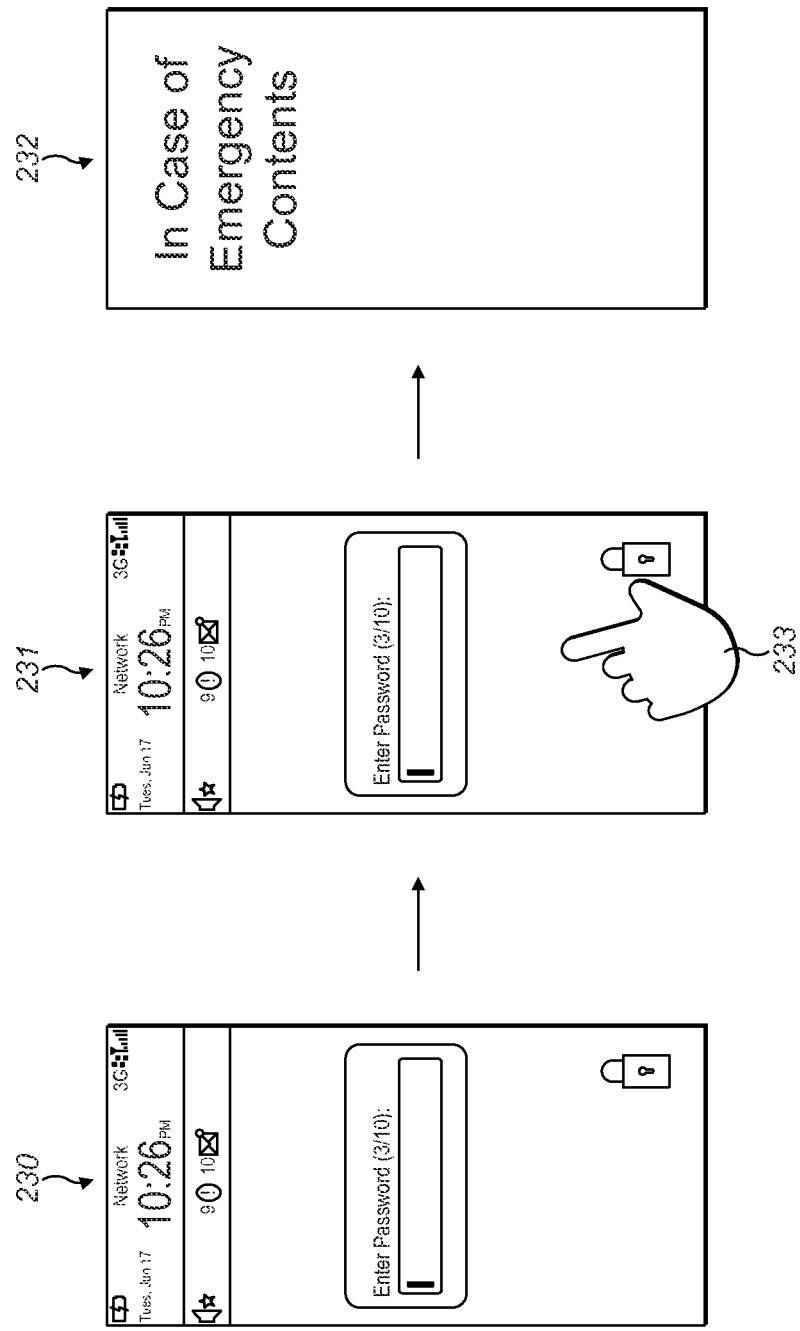
FIG. 18 illustrates an embodiment in which detection of a gesture provides access to emergency information.

FIG. 18 illustrates how a predetermined gesture may provide access to emergency information. An illustrative lock screen is shown at 230. The user is presented with a password box on which they can enter a password to unlock the device. At step 231, the user performs a predetermined gesture 233, to provide access to the emergency information. Once the specific predetermined gesture, is detected, the In Case of Emergency contents are displayed by the device at 232. In this illustration, one finger is shown forming the predetermined gesture, 233, however this could be two or more fingers.

Exemplary predetermined gestures for accessing emergency information will now be described. The exemplary gestures described are illustrated in FIGS. 19A to 19G. The given examples are not exhaustive. In a preferred embodiment, illustrated in FIG. 19A, the predetermined touch gesture consists of a single-finger or multi-finger tap, such as two fingers at once, three fingers at once, etc, made on the touchscreen twice in succession. The touches are performed within a predetermined time period, for example, one second. Optionally, there may be more than two taps, preferably three taps. Any number of taps less than two, and indeed two itself, may interfere with other gestures expected by users across different devices. In this preferred embodiment, the predetermined gesture does not interfere with those commonly recognised gestures, the gesture does not interfere with other gestures recognised by the device, and the specific gesture cannot be easily performed accidentally.

An alternative solution for a predetermined touch gesture comprises drawing one or more symbols/letters/glyphs (referred to hereafter as "symbols") on the touch-screen, sequentially if a plurality of symbols is to be entered. Examples of such symbols to be drawn include (but are not necessarily limited to) "I" (illustrated in FIG. 19B), "ICE" (illustrated in FIG. 19B), "S" (illustrated in FIG. 19C), "SOS" (illustrated in FIG. 19D), "+" (illustrated in FIG. 19E) and a five pointed star to signify the asterisk (illustrated in FIG. 19F). These gestures may be made by the user in a way that the user would commonly not normally enter such a symbol, for example using a plurality of fingers.

Figure 19B:
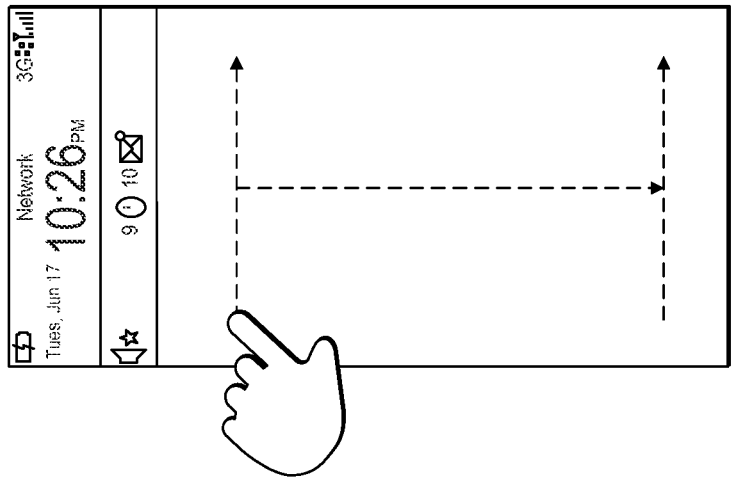
Figure 19A:
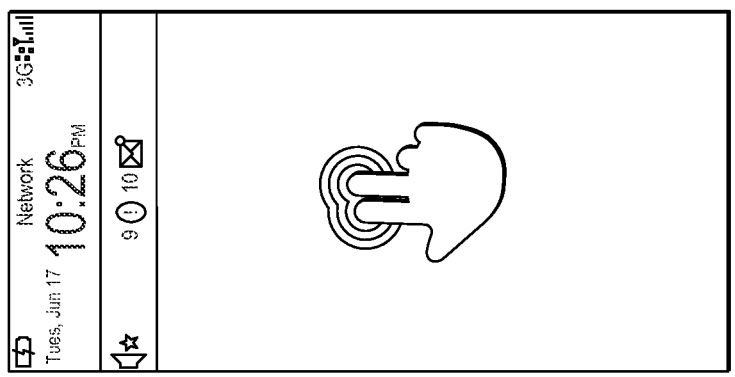
Figure 19D:
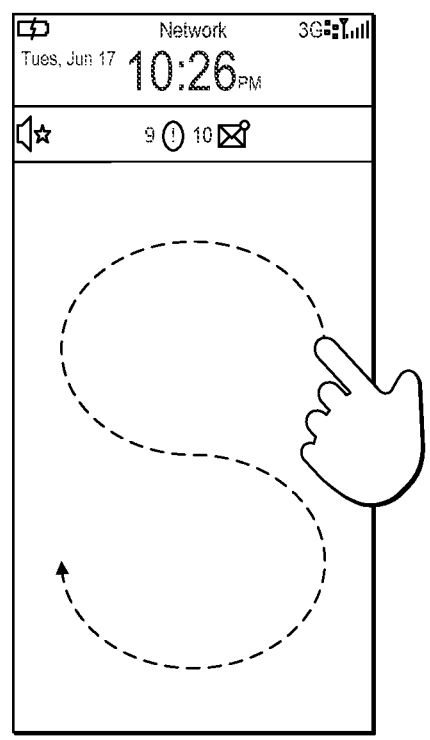
Figure 19E:
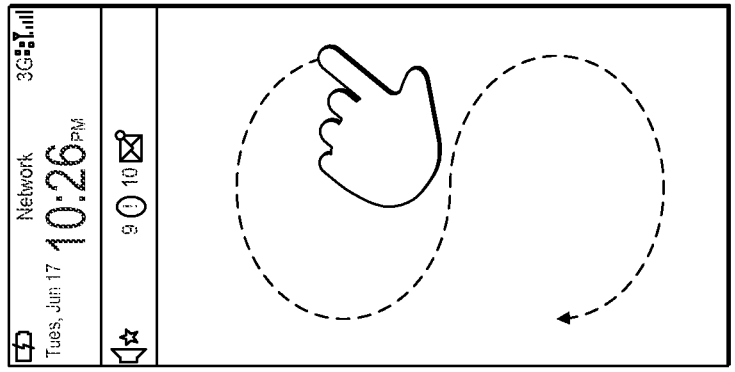
Figure 19E:
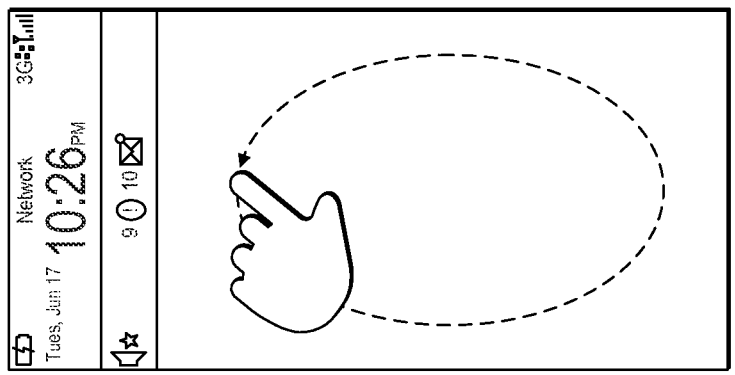
Figure 19E:
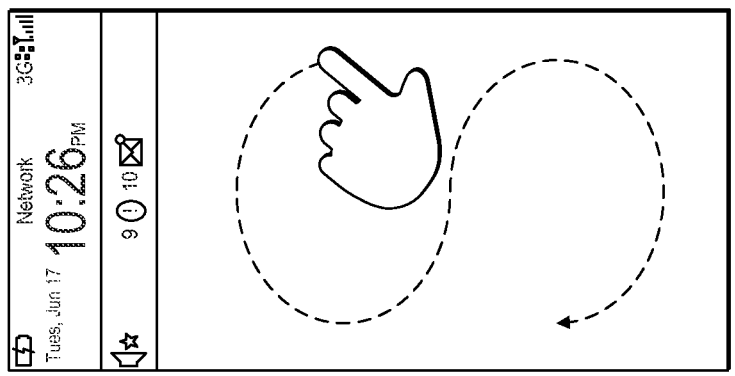
Figure 19G:
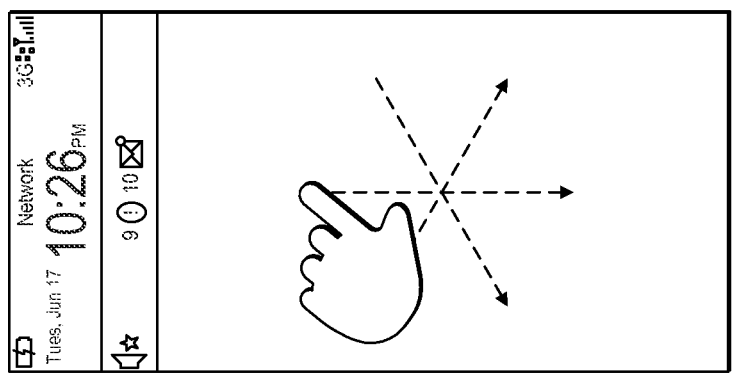
Figure 19F:
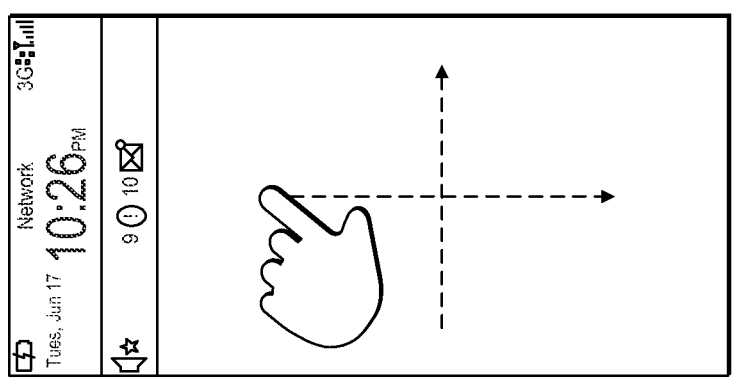

Another alternative solution for a predetermined touch gesture comprises tapping the screen with one or a plurality of fingers to signify Morse code. For example, three short touches of the touch screen followed by three long touches of the touch screen followed by three short touches of the touch screen signifies the well-known Morse code phrase of "SOS". This example is illustrated in FIG. 19G. Alternatively, the Morse code could be indicated using three taps, three swipes or flicks and three taps to indicate the dots and dashes of Morse code.

Although these gestures are described as using fingers or touches, it will be clear that each gestures could be performed without use of a finger for example using a stylus, or without being a touch, for example on a camera based gesture detection mechanism.

If the device's screen has the display disabled/turned off i.e. is set to not display anything but still detect input (for example due to the user specifically turning it off, the device itself automatically switching it off such as for (but not limited to) power saving), then the predetermined touch gesture made by the user may enable/turn-on the display so that the ICE information is readable to the user.

If the ICE information is not available to the device (due to e.g. no data or invalid data in the relevant files and fields), then the device may ignore the entering of a touch-screen gesture for displaying of ICE completely, or provide to the user a specific indication of which could include one or a combination of the following: a visual indication (such as display of a message, flashing of a screen on the device or a screen associated with the device, flashing of an LED or other light source, display of a particular picture/graphic/icon, etc), an audible indication (such as a beep, a ring tone, a piece of music, a sound, etc) and a physical/haptic indication (such as. a vibration, a buzz, temperature change etc).

As stated above, for man-machine interfaces which may not have an obviously available star key, it may be beneficial to provide a menu item to access emergency information. A further exemplary implementation will now be described in which a visual cue is provided to the user to allow access to emergency information. The direct visual cue for ICE information may be provided at the home-screen for users to tap, press or select.

Figure 20:
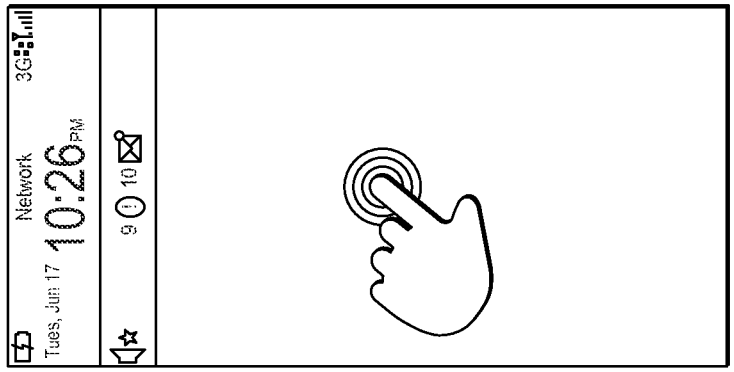
FIG. 20 illustrates a further example gesture for providing access to emergency information according to one embodiment; and, FIG. 21 illustrates an example of a visual cue for providing access to emergency information according to one embodiment.
Figure 20:
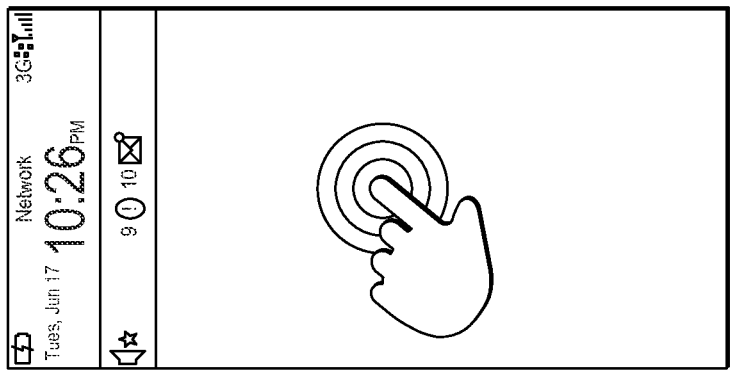
Figure 20:
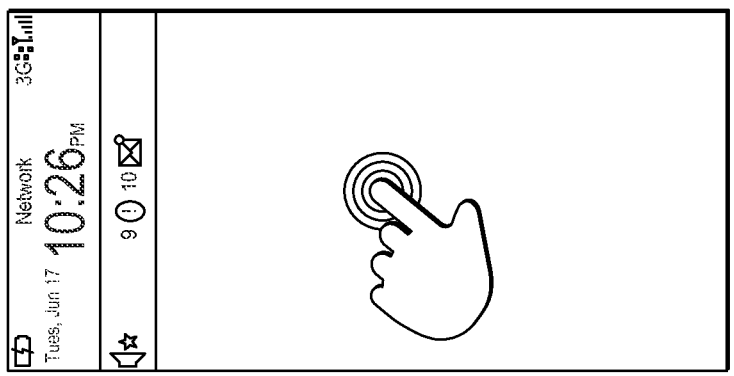
Figure 21:
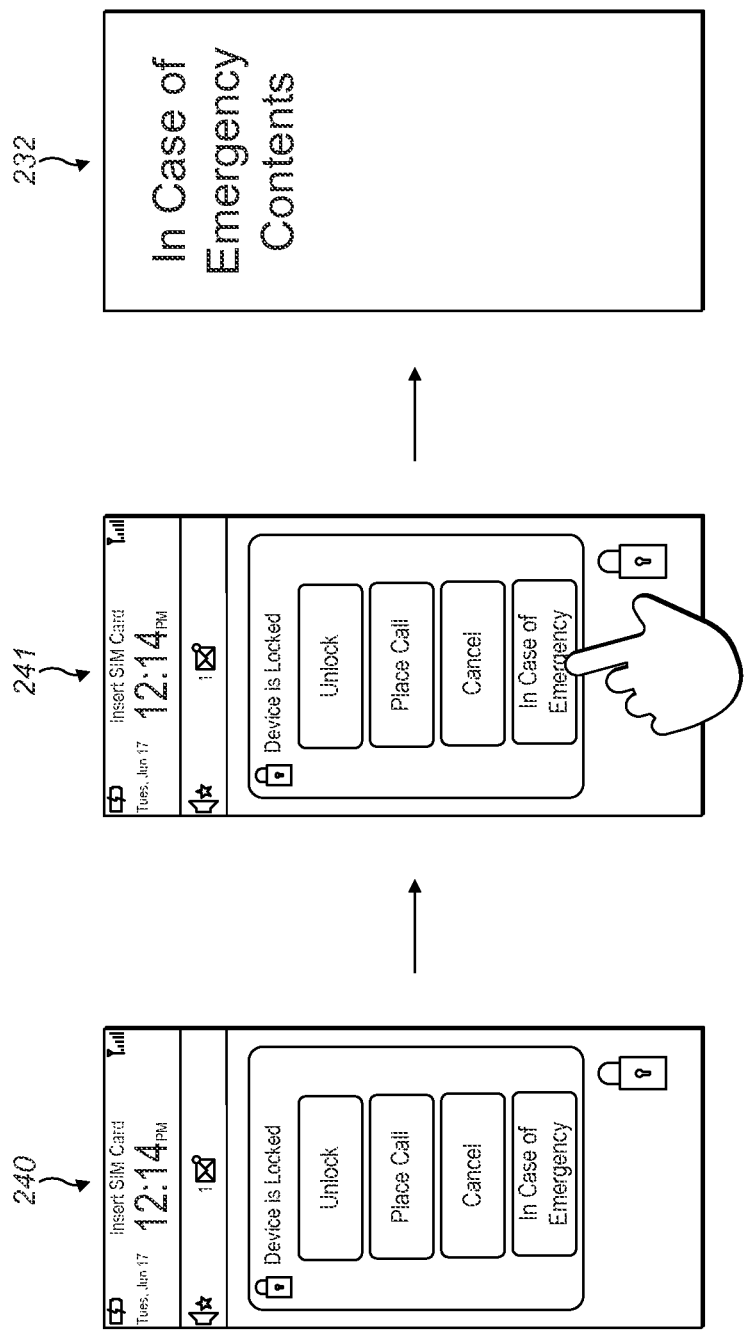

In a first example, the portable device may present a direct "Emergency" or "ICE" user interface object on a locked device screen that users may easily click, tap or select to access the relevant data in emergency situations. FIG. 20 illustrates such a menu screen 240 and user interface object. Screen 241 illustrates the user selecting the user interface object. Once the object is selected, the In Case of Emergency Contents may be displayed to the user, step 232.

If the device's screen has the display disabled or turned off, that is, set to not display anything but still detect input (for example due to the user specifically turning it off, the device itself automatically switching it off such as for, but not limited to, power saving), then the screen may be enabled or switched on and the aforementioned user interface object displayed by using a method known to the user. Such a method may include, but is not necessarily limited to, such actions as pressing, holding or releasing a button or area of the device's screen, pressing, holding or releasing a number of buttons in succession (which may or may not be within a particular time limit), a particular gesture being made on the screen or a switch being moved. The gesture that triggers the display of the user interface object, may be one of the gestures described above.

If the ICE information is not available to the device (due to for example no data or invalid data in the relevant files and fields), then the device may not display a menu item for displaying of ICE information completely, or provide to the user a specific indication of which could include one or a combination of the following: a visual indication such as display of a message, flashing of a screen on the device or a screen associated with the device, flashing of an LED, display of a particular picture/graphic, etc, an audible indication such as a beep, a ring tone, a piece of music, a sound, etc or a physical/haptic indication such as a vibration, a buzz, etc.

The non-keyboard solutions detailed above may be implemented in addition to, or alternative to, the ICE information display mechanism described above of pressing the "*" key three times. Also, such solutions may apply to a device that has touch input via a peripheral, navigational aid or haptic input device other than a touch-screen such as a touch-pad, graphics pad/tablet, track-ball, joy stick, pointing stick, mouse, light pen or stylus (which may have its own separate input pad).

The ICE information to be displayed is obtained from the relevant (U)SIM files, e.g. ICE Elementary Files (known hereafter as "files") on the (U)SIM application (which may, but need not, reside on a UICC in the device) as detailed in 3GPP TS 31.102, including but not limited to: EFICE_DN, EFICE_FF, EFICE graphics. The ICE information may be unavailable to the device for the following reasons:

All of the relevant files as mentioned above are not present in the (U)SIM application;
 All of the relevant files as mentioned above are present in the (U)SIM application or somewhere else that the device has been configured to retrieve them, but one or a combination of the below is true:
  All of the relevant files have been deactivated e.g. using the method described in section/clause 11.1.14 of ETSI TS 102 221.
  All of the relevant files contain no data or illegal/unacceptable/inacceptable/void/null/unsound/damaged/corrupted/invalid data (known hereafter as "invalid data") according to 3GPP TS 31.102 (which defines either explicitly or through reference what constitutes valid/correct data), that results in the file being discarded/ignored by the device e.g.:
   No data or invalid data in the EFICE_DN file in one or more of the fields: "Record length", "Alpha Identifier", "Length of BCD number/SSC contents", "TON and NPI", "Dialling Number/SSC String", "Capability/Configuration1 Record Identifier", "Extension1 Record Identifier";
   No data or invalid data in the EFICE_FF file in one or more of the fields: "Record length", "ICE Free Format Label TLV", "ICE Free Format Content TLV"; and/or
   No data or invalid data in the EFICE_graphics file in one or more of the fields: "Record length", "ICE graphics Data object" (where one or more of the following sub-fields of this field contain no data or invalid data: "ICE graphics Data Object tag", "ICE graphics Data Object length", "ICE graphics Content")

All of the relevant files have a "Record length" value set to 0 (zero) and/or all of the relevant fields, and sub-fields of said fields, of all relevant files have a length of 0 (zero).

Those skilled in the art will appreciate that the above storing method represents one example only. Other methods could be used to store the data in locations other than the SIM on a UICC, such as in a memory on the portable device The memory could be built-in memory (i.e. a memory that is not user removable in normal use) or could be a user removable memory card, such as a MicroSD card). The data could also be partially stored on a UICC and in the device (either on built-in or removable memory).

The device could be configured to use the UICC, the information stored on the device or other removable memory, or other solution as a priority. This configuration could consist of a field, flag or indicator in the device or on the UICC or both that identifies where the device should get the data from.

The following are particularly preferred aspects of the present invention.

The access module may be arranged to provide user access to the emergency information regardless of whether or not a SIM is locked by a personal identification number 'PIN' and whether or not the portable device is locked by a personal identification number 'PIN'. The PIN associated with the SIM may be the same or different to the PIN associated with portable device.

The emergency information may be stored in a dedicated file.

The dedicated file may comprise an in case of emergency User elemental file and an in case of emergency contact elemental file.

The User elemental file may comprise user information comprising one or more of Name, Address, Country, Time Zone, Language(s), Phone number, Mobile number, Travel Information, Medical Information, and Comment.

The contact elemental file may comprise contact information comprising one or more of Name, Relationship, Address, Time Zone, Country, Language(s), Home Phone number, Work Phone number, Mobile number, Comments, Travel Information, and Medical Information.

The portable device may be one of a cell phone, a wireless device, a personal information assistant, an MP3 player, and a multifunction portable electronic device.

The emergency information may be provided in two or more languages.

The portable device may comprise an in case of emergency state in an access procedure of the portable device.

The in case of emergency state is a state in which emergency information is made available in response to the detection of one or more predetermined gestures performed by the user.

While in the in case of emergency state only the emergency information may be available if the portable device had been locked in a previous state.

The detection of one or more predetermined gestures performed by the user may causes the portable device to enter the in case of emergency state from a previous state.

An end key function may cause the handset to enter a wait state from the the in case of emergency state.

The emergency information may be in case of emergency 'ICE' information.

The system and methods according to the present disclosure may be implemented by any hardware, software or a combination of hardware and software having the above described functions. The software code, either in its entirety or a part thereof, may be stored in a computer readable memory. Further, a computer data signal representing the software code which may be embedded in a carrier wave may be transmitted via a communication network. Such a computer readable memory and a computer data signal are also within the scope of the present disclosure, as well as the hardware, software and the combination thereof.

While particular embodiments of the patent disclosure have been shown and described, changes and modifications may be made to such embodiments without departing from the true scope of the patent disclosure.

What is claimed is:

1. A portable device capable of storing In Case of Emergency (ICE) information comprising a number of ICE entries and which may be placed in a locked condition, the portable device comprising:
   a man-machine interface;
   a display; and,
   a processor coupled to the display and to the man-machine interface, wherein the processor is adapted to cause the display, in response to detection of one or more predetermined gestures each comprising a plurality of detected positions on the man-machine interface, to display at least one ICE entry, wherein the one or more, predetermined gestures includes two or more substantially simultaneous taps made two or more times within a predetermined time period; and
   wherein the display displays the at least one ICE entry even if the portable device is in the locked condition, and if the at least one ICE entry is displayed while the portable device is in the locked condition, other information stored on the portable device remains protected.

2. The portable device of claim 1, wherein the one or more predetermined gestures includes a graphical component.

3. The portable device of claim 1, wherein the one or more predetermined gestures includes a plurality of gestures performed within a predetermined amount of time.

4. The portable device of claim 1, wherein the predetermined time period is one second.

5. The portable device of claim 1, wherein the one or more predetermined gestures includes two substantially simultaneous taps made three times within a predetermined time period.

6. The portable device of claim 1, wherein the one or more predetermined gestures includes three substantially simultaneous taps made three times within a predetermined time period.

7. The portable device of claim 1, wherein the one or more predetermined gestures includes one or more symbols.

8. The portable device of claim 7, wherein the one or more symbols includes one or more symbols selected from a group comprising:
   'I';
   'I', 'C', and 'E';
   'S';
   'S', 'O', and 'S';
   '+'; and,
   a five pointed star.

9. The portable device of claim 1, wherein the one or more predetermined gestures includes morse code.

10. The portable device of claim 9, wherein the one or more predetermined gestures includes morse code for 'SOS', wherein the one or more predetermined gestures includes three short taps, three long taps and three short taps.

11. The portable device of claim 1, wherein, if the display is deactivated, the processor is adapted to activate the display in response to the detection.

12. The portable device of claim 1, wherein if no emergency information is available, the processor is adapted to ignore the one or more predetermined gestures.

13. The portable device of claim 1, wherein if no emergency information is available, the processor is adapted to provide an indication to the user selected from a group comprising one or more of: a display of a message, flashing of a screen associated with the device, flashing of a light source, display a graphical indication, a beep, a ring tone, a musical indication, a sound, a vibration, a buzz or a temperature change.

14. The portable device of claim 1, wherein the man-machine interface includes a touch screen.

15. The portable device of claim 14, wherein the touch screen overlies the display or forms a part of the display.

16. The portable device of claim 1, wherein the processor is adapted to provide access to the ICE information by by-passing or over-riding a lock condition associated with the man-machine interface.

17. The portable device of claim 1, wherein the processor is configured to provide access to the ICE information by by-passing or over-riding a lock condition associated with information stored in a Subscriber Information Module (SIM).

18. The portable device of claim 1, wherein the processor comprises an access module for providing a user with access to the ICE information.

19. The portable device of claim 1, wherein the portable device comprises a memory for storing the ICE information.

20. The portable device of claim 1, wherein the portable device is adapted to have inserted, in use, a Universal Integrated Circuit Card (UICC), the UICC storing the ICE information.

21. The portable device of claim 19, wherein the portable device is adapted to have inserted, in use, a removable memory card, the removable memory card storing the ICE information.

22. A method of providing access to emergency information in a portable device having a display and a man-machine interface, the portable device being capable of storing In Case of Emergency (ICE) information comprising a number of ICE entries and which may be placed in a locked condition, the method comprising:
in response to detection of one or more predetermined gestures each comprising a plurality of detected positions on the man-machine interface, displaying at least one ICE entry, wherein the one or more predetermined gestures includes two or more substantially simultaneous taps made two or more times within a predetermined time period;
wherein even if the portable device is in the locked condition, the at least one ICE entry is displayed, and if the at least one ICE entry is displayed while the portable device is in the locked condition, other information stored on the portable device remains protected.

23. The method of claim 22, wherein the one or more predetermined gestures includes a graphical component.

24. The method of claim 22, wherein the one or more predetermined gestures includes a plurality of gestures performed within a predetermined amount of time.

25. The method of claim 22, wherein the predetermined time period is one second.

26. The method of claim 22, wherein the one or more predetermined gestures includes two substantially simultaneous taps made three times within a predetermined time period.

27. The method of claim 22, wherein the one or more predetermined gestures includes three substantially simultaneous taps made three times within a predetermined time period.

28. The method of claim 22, wherein the one or more predetermined gestures includes one or more symbols.

29. The method of claim 28, wherein the one or more symbols includes one or more symbols selected from a group comprising:
'I';
'I', 'C', and 'E';
'S';
'S', 'O', and 'S';
'+'; and,
a five pointed star.

30. The method of claim 22, wherein the one or more predetermined gestures includes morse code.

31. The method of claim 30, wherein the one or more predetermined gestures includes morse code for 'SOS', wherein the one or more predetermined gestures includes three short taps, three long taps and three short taps.

32. The method of claim 22, wherein, if the display is deactivated, the method further comprises activating the display in response to the detection.

33. The method of claim 22, wherein if no emergency information is available, the method further comprises ignoring the one or more predetermined gestures.

34. The method of claim 22, wherein if no emergency information is available, the method further comprises providing an indication to the user selected from a group comprising one or more of: a display of a message, flashing of a screen associated with the device, flashing of a light source, display a graphical indication, a beep, a ring tone, a musical indication, a sound, a vibration, a buzz or a temperature change.

35. The method of claim 22, wherein the man-machine interface includes a touch screen.

36. The method of claim 22, further comprising:
providing access to the ICE information by by-passing or over-riding a lock condition associated with the man-machine interface.

37. The method of claim 22, further comprising:
providing access to the ICE information by by-passing or over-riding a lock condition associated with information stored in a Subscriber Information Module (SIM).

38. The method of claim 22, wherein the portable device has a memory for storing the ICE information.

39. The method of claim 22, wherein the portable device is capable of having inserted, in use, a Universal Integrated Circuit Card (UICC) storing the ICE information.

40. The method of claim 22, wherein the portable device is capable of having inserted, in use, a removable memory card storing the ICE information.

41. A computer program product for providing ICE on a portable device, the computer program product comprising a computer readable medium embodying program code means for implementing on the portable device the method of claim 22.

42. The portable device of claim 1, wherein the portable device is adapted to be configurable to retrieve the ICE information in one or more of a memory, a Universal Integrated Circuit Card (UICC) inserted in the portable device and a removable memory card inserted in the portable device.

43. The portable device of claim 1, wherein the portable device is adapted to be configurable to retrieve the ICE information in one or more of a memory, a Universal Integrated Circuit Card (UICC) inserted in the portable device and a removable memory card inserted in the portable device in accordance with a predetermined priority.

44. The method of claim 22, wherein the portable device is configurable to retrieve the ICE information in one or more of a memory, a Universal Integrated Circuit Card (UICC) inserted in the portable device and a removable memory card inserted in the portable device.

45. The method of claim 22, wherein the portable device is configurable to retrieve the ICE information in one or more of a memory, a Universal Integrated Circuit Card (UICC) inserted in the portable device and a removable memory card inserted in the portable device in accordance with a predetermined priority.

* * * * *